US011656357B2

(12) United States Patent
Pivac

(10) Patent No.: US 11,656,357 B2
(45) Date of Patent: May 23, 2023

(54) LASER TRACKER WITH IMPROVED ROLL ANGLE MEASUREMENT

(71) Applicant: FASTBRICK IP PTY LTD, High Wycombe (AU)

(72) Inventor: Mark Joseph Pivac, Lesmurdie (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 0 days.

(21) Appl. No.: 16/639,463

(22) PCT Filed: Aug. 16, 2018

(86) PCT No.: PCT/AU2018/050873
§ 371 (c)(1),
(2) Date: Feb. 14, 2020

(87) PCT Pub. No.: WO2019/033170
PCT Pub. Date: Feb. 21, 2019

(65) Prior Publication Data
US 2021/0080582 A1 Mar. 18, 2021

(30) Foreign Application Priority Data
Aug. 17, 2017 (AU) .................................. 2017903310

(51) Int. Cl.
*G01S 17/66* (2006.01)
*G01S 17/04* (2020.01)
*G01B 11/26* (2006.01)

(52) U.S. Cl.
CPC .............. *G01S 17/66* (2013.01); *G01B 11/26* (2013.01); *G01S 17/04* (2020.01)

(58) Field of Classification Search
CPC ........ G01S 2205/00; G01S 7/00; G01S 17/00; G01S 17/02; G01S 17/66; G01B 11/26;
(Continued)

(56) References Cited

U.S. PATENT DOCUMENTS 1,633,192 A 6/1927 Reagan
1,829,435 A 10/1931 Barnhart
(Continued)

FOREIGN PATENT DOCUMENTS

CN 101360873 B 2/2009
CN 101476883 A 7/2009
(Continued)

OTHER PUBLICATIONS

Partial Supplementary European Search Report dated Apr. 14, 2020 in European Patent Application No. 17826696.1, 10 pages.

*Primary Examiner* — Sunghee Y Gray
(74) *Attorney, Agent, or Firm* — Perkins Coie LLP

(57) ABSTRACT

The present disclosure relates to a tracking system for tracking the position and orientation of an object in an environment, the tracking system including: (a) a tracking base positioned in the environment; (b) a tracking target mountable to the object, wherein in use the tracking base is linked to the tracking target by: (i) a bidirectional light beam transmitted therebetween; and, (ii) a unidirectional light beam transmitted therebetween, said unidirectional light beam parallel to the bidirectional light beam; and, (c) at least one controller configured to determine a roll angle of the tracking target relative to the tracking base, the roll angle determined at least in part by signals received from a sensor housed in at least one of the tracking base and the tracking target that detects the unidirectional light beam.

17 Claims, 8 Drawing Sheets

(58) Field of Classification Search
CPC ............ G01B 9/02029; G01B 9/02057; G01B 11/00; G01B 7/004; G01B 7/14; G01B 7/28
USPC ...................................................... 356/614
See application file for complete search history.

(56) References Cited

U.S. PATENT DOCUMENTS

| | | |
|---|---|---|
| 3,438,171 A | 4/1969 | Demarest |
| 3,757,484 A | 9/1973 | Williamson et al. |
| 3,790,428 A | 2/1974 | Lingl |
| RE28,305 E | 1/1975 | Williamson et al. |
| 3,930,929 A | 1/1976 | Lingl |
| 3,950,914 A | 4/1976 | Lowen |
| 4,033,463 A | 7/1977 | Cervin |
| 4,106,259 A | 8/1978 | Taylor-smith |
| 4,221,258 A | 9/1980 | Richard |
| 4,245,451 A | 1/1981 | Taylor-smith |
| 4,303,363 A | 12/1981 | Cervin |
| 4,523,100 A | 6/1985 | Payne |
| 4,708,562 A | 11/1987 | Melan et al. |
| 4,714,339 A | 12/1987 | Lau |
| 4,758,036 A | 7/1988 | Legille et al. |
| 4,765,789 A | 8/1988 | Lonardi et al. |
| 4,790,651 A | 12/1988 | Brown et al. |
| 4,827,689 A | 5/1989 | Lonardi et al. |
| 4,852,237 A | 8/1989 | Tradt et al. |
| 4,911,595 A | 3/1990 | Kirchen et al. |
| 4,945,493 A | 7/1990 | Huang et al. |
| 4,952,772 A | 8/1990 | Zana |
| 4,954,762 A | 9/1990 | Miyake et al. |
| 4,969,789 A | 11/1990 | Searle |
| 5,004,844 A | 4/1991 | Van Leeuwen et al. |
| 5,013,986 A | 5/1991 | Gauggel |
| 5,018,923 A | 5/1991 | Melan et al. |
| 5,049,797 A | 9/1991 | Phillips |
| 5,080,415 A | 1/1992 | Bjornson |
| 5,196,900 A | 3/1993 | Pettersen |
| 5,284,000 A | 2/1994 | Milne et al. |
| 5,321,353 A | 6/1994 | Furness |
| 5,403,140 A | 4/1995 | Carmichael et al. |
| 5,413,454 A | 5/1995 | Movsesian |
| 5,419,669 A | 5/1995 | Kremer et al. |
| 5,420,489 A | 5/1995 | Hansen et al. |
| 5,469,531 A | 11/1995 | Faure et al. |
| 5,497,061 A | 3/1996 | Nonaka et al. |
| 5,523,663 A | 6/1996 | Tsuge et al. |
| 5,527,145 A | 6/1996 | Duncan |
| 5,557,397 A | 9/1996 | Hyde et al. |
| 5,737,500 A | 4/1998 | Seraji et al. |
| 5,838,882 A | 11/1998 | Gan et al. |
| 6,018,923 A | 2/2000 | Wendt |
| 6,049,377 A | 4/2000 | Lau et al. |
| 6,101,455 A | 8/2000 | Davis |
| 6,134,507 A | 10/2000 | Markey, Jr. et al. |
| 6,166,809 A | 12/2000 | Pettersen et al. |
| 6,166,811 A | 12/2000 | Long et al. |
| 6,172,754 B1 | 1/2001 | Niebuhr |
| 6,213,309 B1 | 4/2001 | Dadisho |
| 6,285,959 B1 | 9/2001 | Greer |
| 6,310,644 B1 | 10/2001 | Keightley |
| 6,330,503 B1 | 12/2001 | Sharp et al. |
| 6,370,837 B1 | 4/2002 | Mcmahon et al. |
| 6,427,122 B1 | 7/2002 | Lin |
| 6,429,016 B1 | 8/2002 | Mcneil |
| 6,512,993 B2 | 1/2003 | Kacyra et al. |
| 6,516,272 B2 | 2/2003 | Lin |
| 6,584,378 B1 | 6/2003 | Anfindsen |
| 6,611,141 B1 | 8/2003 | Schulz |
| 6,618,496 B1 | 9/2003 | Tassakos et al. |
| 6,628,322 B1 | 9/2003 | Cerruti |
| 6,643,002 B2 | 11/2003 | Drake, Jr. |
| 6,664,529 B2 | 12/2003 | Pack et al. |
| 6,681,145 B1 | 1/2004 | Greenwood et al. |
| 6,683,694 B2 | 1/2004 | Cornil |
| 6,704,619 B1 | 3/2004 | Coleman et al. |
| 6,741,364 B2 | 5/2004 | Lange et al. |
| 6,825,937 B1 | 11/2004 | Gebauer et al. |
| 6,850,946 B1 | 2/2005 | Rappaport et al. |
| 6,859,729 B2 | 2/2005 | Breakfield et al. |
| 6,864,966 B2 | 3/2005 | Giger |
| 6,868,847 B2 | 3/2005 | Ainedter et al. |
| 6,873,880 B2 | 3/2005 | Hooke et al. |
| 6,917,893 B2 | 7/2005 | Dietsch et al. |
| 6,935,036 B2 | 8/2005 | Barber et al. |
| 6,957,496 B2 | 10/2005 | Raab et al. |
| 6,965,843 B2 | 11/2005 | Hobden et al. |
| 6,970,802 B2 | 11/2005 | Ban et al. |
| 6,996,912 B2 | 2/2006 | Raab et al. |
| 7,050,930 B2 | 5/2006 | Hobden et al. |
| 7,051,450 B2 | 5/2006 | Barber et al. |
| 7,069,664 B2 | 7/2006 | Barber et al. |
| 7,107,144 B2 | 9/2006 | Capozzi et al. |
| 7,111,437 B2 | 9/2006 | Ainedter |
| 7,130,034 B2 | 10/2006 | Barvosa-carter et al. |
| 7,142,981 B2 | 11/2006 | Hablani |
| 7,145,647 B2 | 12/2006 | Suphellen et al. |
| 7,153,454 B2 | 12/2006 | Khoshnevis |
| 7,174,651 B2 | 2/2007 | Barber et al. |
| 7,230,689 B2 | 6/2007 | Lau |
| 7,246,030 B2 | 7/2007 | Raab et al. |
| 7,269,910 B2 | 9/2007 | Raab et al. |
| 7,347,311 B2 | 3/2008 | Rudge |
| 7,519,493 B2 | 4/2009 | Atwell et al. |
| 7,551,121 B1 | 6/2009 | Oconnell et al. |
| 7,564,538 B2 | 7/2009 | Sakimura et al. |
| 7,570,371 B1 | 8/2009 | Storm |
| 7,576,836 B2 | 8/2009 | Bridges |
| 7,576,847 B2 | 8/2009 | Bridges |
| 7,591,078 B2 | 9/2009 | Crampton |
| 7,639,347 B2 | 12/2009 | Eaton |
| 7,693,325 B2 | 4/2010 | Pulla et al. |
| 7,701,587 B2 | 4/2010 | Shioda et al. |
| 7,774,159 B2 | 8/2010 | Cheng et al. |
| 7,800,758 B1 | 9/2010 | Bridges et al. |
| 7,804,602 B2 | 9/2010 | Raab |
| RE42,055 E | 1/2011 | Raab et al. |
| RE42,082 E | 2/2011 | Raab et al. |
| 7,881,896 B2 | 2/2011 | Atwell et al. |
| 7,967,549 B2 | 6/2011 | Geist et al. |
| 7,993,289 B2 | 8/2011 | Quistgaard et al. |
| 8,036,452 B2 | 10/2011 | Pettersson et al. |
| 8,054,451 B2 | 11/2011 | Karazi et al. |
| 8,060,344 B2 | 11/2011 | Stathis |
| 8,145,446 B2 | 3/2012 | Atwell et al. |
| 8,166,727 B2 | 5/2012 | Pivac et al. |
| 8,169,604 B2 | 5/2012 | Braghiroli et al. |
| 8,185,240 B2 | 5/2012 | Williams et al. |
| 8,229,208 B2 | 7/2012 | Pulla et al. |
| 8,233,153 B2 | 7/2012 | Knuettel |
| 8,244,030 B2 | 8/2012 | Pettersson et al. |
| 8,248,620 B2 | 8/2012 | Wicks et al. |
| 8,269,984 B2 | 9/2012 | Hinderling et al. |
| 8,327,555 B2 | 12/2012 | Champ |
| 8,337,407 B2 | 12/2012 | Quistgaard et al. |
| 8,345,926 B2 | 1/2013 | Clark et al. |
| 8,346,392 B2 | 1/2013 | Walser et al. |
| 8,405,716 B2 | 3/2013 | Yu et al. |
| 8,467,072 B2 | 6/2013 | Cramer et al. |
| 8,537,372 B2 | 9/2013 | Siercks et al. |
| 8,537,376 B2 | 9/2013 | Day et al. |
| 8,558,992 B2 | 10/2013 | Steffey |
| 8,593,648 B2 | 11/2013 | Cramer et al. |
| 8,595,948 B2 | 12/2013 | Raab et al. |
| 8,606,399 B2 | 12/2013 | Williams et al. |
| 8,634,950 B2 | 1/2014 | Simonetti et al. |
| 8,644,964 B2 | 2/2014 | Hendron et al. |
| 8,670,114 B2 | 3/2014 | Bridges et al. |
| 8,677,643 B2 | 3/2014 | Bridges et al. |
| 8,792,709 B2 | 7/2014 | Pulla et al. |
| 8,803,055 B2 | 8/2014 | Lau et al. |
| 8,812,155 B2 | 8/2014 | Brethe |
| 8,825,208 B1 | 9/2014 | Benson |
| 8,832,954 B2 | 9/2014 | Atwell et al. |

(56) References Cited

U.S. PATENT DOCUMENTS

| | | |
|---|---|---|
| 8,848,203 B2 | 9/2014 | Bridges et al. |
| 8,875,409 B2 | 11/2014 | Kretschmer et al. |
| 8,898,919 B2 | 12/2014 | Bridges et al. |
| 8,902,408 B2 | 12/2014 | Bridges |
| 8,913,814 B2 | 12/2014 | Gandyra |
| 8,931,182 B2 | 1/2015 | Raab et al. |
| 8,942,940 B2 | 1/2015 | York |
| 8,965,571 B2 | 2/2015 | Peters et al. |
| 8,996,244 B2 | 3/2015 | Summer et al. |
| 8,997,362 B2 | 4/2015 | Briggs et al. |
| 9,020,240 B2 | 4/2015 | Pettersson et al. |
| 9,033,998 B1 | 5/2015 | Schaible et al. |
| RE45,565 E | 6/2015 | Bridges et al. |
| 9,046,360 B2 | 6/2015 | Atwell et al. |
| 9,074,381 B1 | 7/2015 | Drew |
| 9,109,877 B2 | 8/2015 | Thierman |
| 9,146,315 B2 | 9/2015 | Bosse et al. |
| 9,151,830 B2 | 10/2015 | Bridges |
| 9,163,922 B2 | 10/2015 | Bridges et al. |
| 9,170,096 B2 | 10/2015 | Fowler et al. |
| 9,188,430 B2 | 11/2015 | Atwell et al. |
| 9,207,309 B2 | 12/2015 | Bridges |
| 9,223,025 B2 | 12/2015 | Debrunner et al. |
| 9,229,108 B2 | 1/2016 | Debrunner et al. |
| 9,266,238 B2 | 2/2016 | Huettenhofer |
| 9,267,784 B2 | 2/2016 | Atwell et al. |
| 9,278,448 B2 | 3/2016 | Freeman |
| 9,279,661 B2 | 3/2016 | Tateno et al. |
| 9,303,988 B2 | 4/2016 | Tani |
| 9,353,519 B2 | 5/2016 | Williams |
| 9,354,051 B2 | 5/2016 | Dunne et al. |
| 9,358,688 B2 | 6/2016 | Drew |
| 9,367,741 B2 | 6/2016 | Le Marec |
| 9,377,301 B2 | 6/2016 | Neier et al. |
| 9,383,200 B2 | 7/2016 | Hulm et al. |
| 9,395,174 B2 | 7/2016 | Bridges |
| 9,405,293 B2 | 8/2016 | Meuleau |
| 9,423,282 B2 | 8/2016 | Moy |
| 9,437,005 B2 | 9/2016 | Tateno et al. |
| 9,443,308 B2 | 9/2016 | Pettersson et al. |
| 9,452,533 B2 | 9/2016 | Calkins et al. |
| 9,454,818 B2 | 9/2016 | Cramer |
| 9,476,695 B2 | 10/2016 | Becker et al. |
| 9,482,524 B2 | 11/2016 | Metzler et al. |
| 9,482,525 B2 | 11/2016 | Bridges |
| 9,482,746 B2 | 11/2016 | Bridges |
| 9,494,686 B2 | 11/2016 | Maryfield et al. |
| 9,513,100 B2 | 12/2016 | Raab et al. |
| 9,536,163 B2 | 1/2017 | Veeser et al. |
| 9,541,371 B2 | 1/2017 | Pettersson et al. |
| 9,561,019 B2 | 2/2017 | Mihailescu et al. |
| 9,607,239 B2 | 3/2017 | Bridges et al. |
| 9,618,620 B2 | 4/2017 | Zweigle et al. |
| 9,658,061 B2 | 5/2017 | Wilson et al. |
| 9,671,221 B2 | 6/2017 | Ruhland et al. |
| 9,679,385 B2 | 6/2017 | Suzuki et al. |
| 9,686,532 B2 | 6/2017 | Tohme |
| 9,708,079 B2 | 7/2017 | Desjardien et al. |
| 9,715,730 B2 | 7/2017 | Suzuki |
| 9,720,087 B2 | 8/2017 | Christen et al. |
| 9,734,609 B2 | 8/2017 | Pulla et al. |
| 9,739,595 B2 | 8/2017 | Lau |
| 9,746,308 B2 | 8/2017 | Gong |
| 9,757,859 B1 | 9/2017 | Kolb et al. |
| 9,768,837 B2 | 9/2017 | Charvat et al. |
| 9,772,173 B2 | 9/2017 | Atwell et al. |
| 9,803,969 B2 | 10/2017 | Gong |
| 9,816,813 B2 | 11/2017 | Lettau et al. |
| 9,829,305 B2 | 11/2017 | Gong |
| 9,835,717 B2 | 12/2017 | Bosse et al. |
| 9,844,792 B2 | 12/2017 | Pettersson et al. |
| 9,879,976 B2 | 1/2018 | Bridges et al. |
| 9,897,442 B2 | 2/2018 | Pettersson et al. |
| 9,903,939 B2 | 2/2018 | Charvat et al. |
| 9,909,855 B2 | 3/2018 | Becker et al. |
| 9,915,733 B2 | 3/2018 | Fried et al. |
| 9,921,046 B2 | 3/2018 | Gong |
| 9,958,268 B2 | 5/2018 | Ohtomo et al. |
| 9,958,545 B2 | 5/2018 | Eichenholz et al. |
| 9,964,398 B2 | 5/2018 | Becker et al. |
| 9,964,402 B2 | 5/2018 | Tohme et al. |
| 9,967,545 B2 | 5/2018 | Tohme |
| 9,989,353 B2 | 6/2018 | Bartmann et al. |
| 10,012,732 B2 | 7/2018 | Eichenholz et al. |
| 10,030,972 B2 | 7/2018 | Iseli et al. |
| 10,041,793 B2 | 8/2018 | Metzler et al. |
| 10,054,422 B2 | 8/2018 | Böckem et al. |
| 10,058,394 B2 | 8/2018 | Johnson et al. |
| 10,073,162 B2 | 9/2018 | Charvat et al. |
| 10,074,889 B2 | 9/2018 | Charvat et al. |
| 10,082,521 B2 | 9/2018 | Atlas et al. |
| 10,090,944 B1 | 10/2018 | Charvat et al. |
| 10,094,909 B2 | 10/2018 | Charvat et al. |
| 10,126,415 B2 | 11/2018 | Becker et al. |
| 10,189,176 B2 | 1/2019 | Williams |
| 10,220,511 B2 | 3/2019 | Linnell et al. |
| 10,240,949 B2 | 3/2019 | Peters et al. |
| 10,876,308 B2 | 12/2020 | Pivac et al. |
| 11,106,836 B2 | 8/2021 | Pivac et al. |
| 2002/0176603 A1 | 11/2002 | Bauer et al. |
| 2003/0048459 A1 | 3/2003 | Gooch |
| 2003/0090682 A1 | 5/2003 | Gooch et al. |
| 2003/0120377 A1 | 6/2003 | Hooke et al. |
| 2003/0206285 A1 | 11/2003 | Lau |
| 2003/0208302 A1 | 11/2003 | Lemelson |
| 2004/0078137 A1 | 4/2004 | Breakfield et al. |
| 2004/0093119 A1 | 5/2004 | Gunnarsson et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2005/0252118 A1 | 11/2005 | Matsufuji |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2009/0038258 A1 | 2/2009 | Pivac et al. |
| 2009/0074979 A1 | 3/2009 | Krogedal et al. |
| 2010/0025349 A1 | 2/2010 | Khoshnevis |
| 2010/0138185 A1 | 6/2010 | Kang |
| 2010/0143089 A1 | 6/2010 | Hvass |
| 2010/0152899 A1 | 6/2010 | Chang et al. |
| 2010/0274390 A1 | 10/2010 | Walser et al. |
| 2010/0281822 A1 | 11/2010 | Murray |
| 2011/0043515 A1 | 2/2011 | Stathis |
| 2011/0066393 A1 | 3/2011 | Groll et al. |
| 2011/0153524 A1 | 6/2011 | Schnackel |
| 2011/0208347 A1 | 8/2011 | Otake et al. |
| 2012/0038074 A1 | 2/2012 | Khoshnevis |
| 2012/0099096 A1 | 4/2012 | Bridges et al. |
| 2012/0136524 A1 | 5/2012 | Everett et al. |
| 2012/0265391 A1 | 10/2012 | Letsky |
| 2012/0277898 A1 | 11/2012 | Kawai et al. |
| 2013/0028478 A1 | 1/2013 | St-pierre et al. |
| 2013/0068061 A1 | 3/2013 | Yoon |
| 2013/0103192 A1 | 4/2013 | Huettenhofer |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2013/0297046 A1 | 11/2013 | Hendron et al. |
| 2013/0310982 A1 | 11/2013 | Scheurer |
| 2014/0002608 A1 | 1/2014 | Atwell et al. |
| 2014/0067121 A1 | 3/2014 | Brooks et al. |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |

(56) References Cited

U.S. PATENT DOCUMENTS

| | | |
|---|---|---|
| 2014/0348388 A1 | 11/2014 | Metzler et al. |
| 2014/0366481 A1 | 12/2014 | Benson |
| 2014/0376768 A1 | 12/2014 | Troy |
| 2015/0082740 A1 | 3/2015 | Peters et al. |
| 2015/0100066 A1 | 4/2015 | Kostrzewski et al. |
| 2015/0134303 A1 | 5/2015 | Chang et al. |
| 2015/0153720 A1 | 6/2015 | Pettersson et al. |
| 2015/0158181 A1 | 6/2015 | Kawamura |
| 2015/0165620 A1 | 6/2015 | Osaka |
| 2015/0241203 A1 | 8/2015 | Jordil et al. |
| 2015/0258694 A1 | 9/2015 | Hand et al. |
| 2015/0276402 A1 | 10/2015 | Grsser et al. |
| 2015/0280829 A1 | 10/2015 | Breuer |
| 2015/0293596 A1 | 10/2015 | Krausen et al. |
| 2015/0309175 A1 | 10/2015 | Hinderling et al. |
| 2015/0314890 A1 | 11/2015 | Desjardien et al. |
| 2015/0352721 A1 | 12/2015 | Wicks et al. |
| 2015/0355310 A1 | 12/2015 | Gong et al. |
| 2015/0367509 A1 | 12/2015 | Georgeson |
| 2015/0371082 A1 | 12/2015 | Csaszar et al. |
| 2015/0377606 A1 | 12/2015 | Thielemans |
| 2016/0005185 A1 | 1/2016 | Geissler |
| 2016/0093099 A1 | 3/2016 | Bridges |
| 2016/0153786 A1 | 6/2016 | Liu et al. |
| 2016/0187130 A1 | 6/2016 | Metzler et al. |
| 2016/0187470 A1 | 6/2016 | Becker et al. |
| 2016/0223364 A1 | 8/2016 | Peters et al. |
| 2016/0242744 A1 | 8/2016 | Mihailescu et al. |
| 2016/0263767 A1 | 9/2016 | Williams |
| 2016/0274237 A1 | 9/2016 | Stutz |
| 2016/0282107 A1 | 9/2016 | Roland et al. |
| 2016/0282110 A1 | 9/2016 | Vagman et al. |
| 2016/0282179 A1 | 9/2016 | Nazemi et al. |
| 2016/0288331 A1 | 10/2016 | Sivich et al. |
| 2016/0313114 A1 | 10/2016 | Tohme et al. |
| 2016/0318187 A1 | 11/2016 | Tani |
| 2016/0327383 A1 | 11/2016 | Becker et al. |
| 2016/0340873 A1 | 11/2016 | Eidenberger et al. |
| 2016/0341041 A1 | 11/2016 | Puura et al. |
| 2016/0349746 A1 | 12/2016 | Grau |
| 2016/0363436 A1 | 12/2016 | Clark et al. |
| 2016/0363659 A1 | 12/2016 | Mindell et al. |
| 2016/0363663 A1 | 12/2016 | Mindell et al. |
| 2016/0363664 A1 | 12/2016 | Mindell et al. |
| 2016/0364869 A1 | 12/2016 | Siercks et al. |
| 2016/0364874 A1 | 12/2016 | Tohme et al. |
| 2017/0028550 A1 | 2/2017 | Terada |
| 2017/0066157 A1 | 3/2017 | Peters et al. |
| 2017/0067739 A1 | 3/2017 | Siercks et al. |
| 2017/0071680 A1 | 3/2017 | Swarup |
| 2017/0082436 A1 | 3/2017 | Siercks et al. |
| 2017/0091922 A1 | 3/2017 | Siercks et al. |
| 2017/0091923 A1 | 3/2017 | Siercks et al. |
| 2017/0108528 A1 | 4/2017 | Atlas et al. |
| 2017/0122733 A1 | 5/2017 | Brown |
| 2017/0122736 A1 | 5/2017 | Dold et al. |
| 2017/0166399 A1 | 6/2017 | Stubbs |
| 2017/0173796 A1 | 6/2017 | Kim et al. |
| 2017/0176572 A1 | 6/2017 | Charvat et al. |
| 2017/0179570 A1 | 6/2017 | Charvat |
| 2017/0179603 A1 | 6/2017 | Charvat et al. |
| 2017/0191822 A1* | 7/2017 | Becker .................. G01S 17/89 |
| 2017/0227355 A1 | 8/2017 | Pettersson et al. |
| 2017/0236299 A1 | 8/2017 | Valkenburg et al. |
| 2017/0254102 A1 | 9/2017 | Peters et al. |
| 2017/0269203 A1 | 9/2017 | Trishaun |
| 2017/0291805 A1 | 10/2017 | Hao et al. |
| 2017/0307757 A1 | 10/2017 | Hinderling et al. |
| 2017/0314909 A1 | 11/2017 | Dang |
| 2017/0314918 A1 | 11/2017 | Shah |
| 2017/0333137 A1 | 11/2017 | Roessler |
| 2017/0343336 A1 | 11/2017 | Lettau |
| 2017/0371342 A1 | 12/2017 | Hashimoto |
| 2018/0001479 A1 | 1/2018 | Li et al. |
| 2018/0003493 A1 | 1/2018 | Bernhard et al. |
| 2018/0017384 A1 | 1/2018 | Siercks et al. |
| 2018/0023935 A1 | 1/2018 | Atwell et al. |
| 2018/0038684 A1 | 2/2018 | Fröhlich et al. |
| 2018/0046096 A1 | 2/2018 | Shibazaki |
| 2018/0052233 A1 | 2/2018 | Frank et al. |
| 2018/0108178 A1 | 4/2018 | Murugappan et al. |
| 2018/0121571 A1 | 5/2018 | Tiwari et al. |
| 2018/0149469 A1 | 5/2018 | Becker et al. |
| 2018/0156601 A1 | 6/2018 | Pontai |
| 2018/0170719 A1 | 6/2018 | Tasch et al. |
| 2018/0180416 A1 | 6/2018 | Edelman et al. |
| 2018/0202796 A1 | 7/2018 | Ziegenbein |
| 2018/0209156 A1 | 7/2018 | Pettersson |
| 2018/0239010 A1 | 8/2018 | Mindell et al. |
| 2018/0300433 A1 | 10/2018 | Maxam et al. |
| 2019/0026401 A1 | 1/2019 | Benjamin et al. |
| 2019/0032348 A1 | 1/2019 | Parkes |
| 2019/0184555 A1 | 6/2019 | Linnell et al. |
| 2019/0224846 A1 | 7/2019 | Pivac et al. |
| 2019/0251210 A1 | 8/2019 | Pivac et al. |
| 2019/0316369 A1 | 10/2019 | Pivac et al. |
| 2019/0352146 A1 | 11/2019 | Pivac et al. |
| 2020/0173777 A1 | 6/2020 | Pivac et al. |
| 2020/0206923 A1 | 7/2020 | Pivac et al. |
| 2020/0206924 A1 | 7/2020 | Pivac et al. |
| 2020/0215688 A1 | 7/2020 | Pivac et al. |
| 2020/0215692 A1 | 7/2020 | Pivac et al. |
| 2020/0215693 A1 | 7/2020 | Pivac et al. |
| 2020/0324981 A1 | 10/2020 | Pivac et al. |
| 2021/0016437 A1 | 1/2021 | Pivac et al. |
| 2021/0016438 A1 | 1/2021 | Pivac et al. |
| 2021/0291362 A1 | 9/2021 | Pivac et al. |
| 2021/0370509 A1 | 12/2021 | Pivac et al. |
| 2021/0379775 A1 | 12/2021 | Pivac et al. |

FOREIGN PATENT DOCUMENTS

| | | |
|---|---|---|
| CN | 202925913 U | 5/2013 |
| CN | 103363902 A | 10/2013 |
| CN | 103698769 A | 4/2014 |
| CN | 103753586 B | 12/2015 |
| CN | 105089274 B | 6/2017 |
| CN | 107357294 A | 11/2017 |
| DE | 10230021 C1 | 7/2003 |
| DE | 102006030130 B3 | 9/2007 |
| DE | 102013019869 A1 | 5/2015 |
| EP | 0370682 A2 | 5/1990 |
| EP | 1375083 A2 | 1/2004 |
| EP | 2219528 A1 | 8/2010 |
| EP | 2249997 A1 | 11/2010 |
| EP | 3084719 A1 | 10/2016 |
| WO | 2008110559 A2 | 9/2008 |

* cited by examiner

LASER TRACKER WITH IMPROVED ROLL ANGLE MEASUREMENT

CROSS REFERENCE TO RELATED APPLICATIONS

This application is a United States national phase entry of International Application No. PCT/AU2018/050873 filed on Aug. 16, 2018, which claims priority to Australian Patent Application No. 2017903310 filed on Aug. 17, 2017, both of which are incorporated herein by reference in their entireties.

PRIORITY DOCUMENTS

The present application claims priority from Australian Provisional Application No. 2017903310 titled "LASER TRACKER WITH IMPROVED ROLL ANGLE MEASUREMENT" and filed on 17 Aug. 2017, the content of which is hereby incorporated by reference in its entirety.

BACKGROUND OF THE INVENTION

The present invention relates to a tracking system for measuring the position and orientation of an object in an environment, and in one example to a tracking system including a laser tracker and active target mounted to the object incorporating an improved roll angle measurement.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In this specification, the position and orientation of a target in space are described as Cartesian coordinates along three axes, x, y, and z, and in addition angular attributes of pitch, yaw, and roll.

To accurately control the end effector position of industrial robots or large construction robots, it is necessary to measure the position and orientation of the end effector, or a part of the robot close to the end effector. To achieve dynamic stability and accurate control during movement of the robot, it is necessary to measure the position and orientation at a high data rate and in real time. Delays in the feedback loop of a control system lead to following error and reduced bandwidth and phase margin, all of which are undesirable. Delay can also introduce self-excitation or resonance in servo-controlled systems.

Large construction robots operating outdoors are subject to dynamic movement due to load, acceleration, and external environmental factors such as wind and temperature which cause unwanted vibration and oscillation. To accurately control an end effector positioned for example at the end of a long boom structure, this dynamic movement must be compensated for in real time so as to perform interactions in an environment. An example of a large construction robot requiring real time dynamic motion compensation and stabilisation is the applicant's automatic brick laying machine as described for example in PCT/AU2007/000001 and PCT/AU2017/050731.

Laser trackers such as those described in U.S. Pat. No. 4,714,339 (Lau et al) and U.S. Pat. No. 4,790,651 (Brown et al) are used to measure the position and orientation of a target which is mounted to an object. Lau et al teaches the measurement of the position and orientation of an object in space with three degrees of freedom and preferably five degrees of freedom being position described as Cartesian coordinates along three axes, x, y, and z, and preferably in addition angular attributes of pitch and roll. Kyle in CMSC: Charlotte-Concord, Jul. 21-25, 2008, describes a laser tracker polar measurement system for measuring the position and orientation of a target with six degrees of freedom. Kyle discusses the importance of accurate roll angle sensing. While Kyle discusses various means of achieving the roll angle measurement, there are practical difficulties in achieving accurate roll angle measurement with what was proposed by Kyle.

Manufacturers API (Radian and OT2 with STS (Smart Track Sensor)), Leica (AT960 and Tmac) and Faro provide laser tracker systems, some of which can measure position and orientation of the target. These systems measure position at 300 Hz, or 1 kHz or 2 kHz (depending on the equipment). Orientation measurements (for STS and Tmac) rely on respective vision systems using 2D cameras which measure at a current maximum of 100 Hz. Accelerometer data such as from a tilt sensor or INS (Inertial Navigation System) can be used to determine or predict or interpolate orientation measurements at up to 1000 Hz but the orientation accuracy may only be reduced to 0.01 degree with the known systems (and even this level of accuracy is typically only attainable at 100 Hz).

The Leica Tmac uses frames which each have a field of view of approximately 90 degrees. If a greater field of view is required, multiple Tmac frames must be used and the laser tracker must shift its lock from one to another, which results in a loss of data during the shift. The problem with the loss of data is that during this time, either an alternative data source is required (such as INS measurements), dead reckoning must be used, or the shift needs to be controlled to occur when dynamic motion compensation is not required (for example if the machine is stopped, or moving between tasks needing compensation).

API have in the past described in U.S. Pat. No. 6,049,377, and manufactured a STS using a roll angle sensor using polarised light. This sensor system can provide data at 300 Hz but the roll angle accuracy is only about 0.1 degrees. The STS has the advantage that is has a heading field of view of 360 degrees, and an altitude field of view of plus minus 45 degrees.

Some tracking systems use CCD or CMOS sensors to image roll angle targets but these sensors introduce delay and latency because the 2D sensor data from the pixel array has to be transmitted pixel by pixel to a microprocessor which must then use complex vision algorithms to determine the target locations and thus the roll angle. The vision algorithms used typically take some time, usually in excess of 10 ms or even 100 ms.

All hitherto described laser trackers suffer from poor data rate and/or latency and/or low accuracy when measuring roll angle. Accordingly, it would be desirable to provide a tracking system with improved roll angle measurement to allow rapid determination of the position and orientation of a tracking target relative to a tracking base in six degrees of freedom (6DOF).

It is against this background, and the problems and difficulties associated therewith, that the present invention has been developed.

SUMMARY OF THE PRESENT INVENTION

In one broad form, the present invention seeks to provide a tracking system for tracking the position and orientation of an object in an environment, the tracking system including:
  a) a tracking base positioned in the environment;
  b) a tracking target mountable to the object, wherein in use the tracking base is linked to the tracking target by:
    i) a bidirectional light beam transmitted therebetween; and,
    ii) a unidirectional light beam transmitted therebetween, said unidirectional light beam parallel to the bidirectional light beam; and,
  c) at least one controller configured to determine a roll angle of the tracking target relative to the tracking base, the roll angle determined at least in part by signals received from a sensor housed in at least one of the tracking base and the tracking target that detects the unidirectional light beam.

In one embodiment, the sensor measures the displacement of the unidirectional light beam relative to a datum position on a surface thereof.

In one embodiment, the roll angle is determined from the measured displacement.

In one embodiment, the unidirectional light beam transits an optical mount mounted on at least one of the tracking base and tracking target for controlled rotation about an axis of rotation that is coaxial with the bidirectional light beam, and wherein the controller is configured to control the rotation of the optical mount in order to maintain linkage of the unidirectional light beam transmitted between the tracking base and the tracking target and wherein the angle of the controlled rotation is determined by the controller and roll angle data derived therefrom.

In one embodiment, the sensor is housed in the optical mount, and wherein the sensor provides signals proportional to the location of the unidirectional light beam incident on a surface of the sensor.

In one embodiment, the controller:
  a) receives the signals from the sensor;
  b) processes the signals to determine the location of the unidirectional light beam on the sensor surface; and,
  c) causes the optical mount to rotate about the axis of rotation in accordance with the processed signals so as to locate the unidirectional light beam on the centre of the sensor surface and maintain linkage of the unidirectional light beam transmitted between the tracking base and the tracking target.

In one embodiment, a motor is coupled to the optical mount, and wherein the controller is configured to control the motor to rotate and align the optical mount with the unidirectional light beam.

In one embodiment, the angle of said controlled rotation is determined by said controller from angle encoders and roll angle data is derived therefrom.

In one embodiment, the angle of said controlled rotation includes a correction of following error as determined by a measurement signal from the sensor.

In one embodiment, the angle of said controlled rotation is determined from motor control data.

In one embodiment, the tracking base is a laser tracker and the tracking target is an active target configured to track the tracking base so as to maintain linkage of the bidirectional light beam transmitted between the laser tracker and active target.

In one embodiment, the tracking base includes a first head unit mounted to a first base about two axes normal to each other and wherein the tracking target includes a second head unit that is mounted to a second base about two axes normal to each other, and wherein rotation about the two axes in both head units is controlled by a head unit controller to rotate about their respective said two axes to maintain the linkage of said bidirectional light beam.

In one embodiment, the first head unit is mounted to a first gimbal about a first gimbal axis extending normally to the direction of the bidirectional light beam, the first gimbal being mounted to the first base about a first base axis extending normally to the first gimbal axis, and the second head unit is mounted to a second gimbal about a second gimbal axis extending normally to the direction of the bidirectional light beam, the second gimbal being mounted to the second base about a second base axis extending normally to said second gimbal axis.

In one embodiment, a unidirectional light beam source is located in the tracking base to produce said unidirectional light beam, and said optical mount is located on the tracking target, the optical mount further including the sensor to detect the unidirectional light beam.

In one embodiment, a unidirectional light beam source is located in the tracking target to produce the unidirectional light beam, and said optical mount is located on the tracking base, the optical mount further including the sensor to detect the unidirectional light beam.

In one embodiment, a unidirectional light beam source is located in the optical mount to produce the unidirectional light beam and the optical mount is located on the tracking target, and the tracking base includes the sensor to detect the unidirectional light beam.

In one embodiment, a unidirectional light beam source is located in the optical mount to produce the unidirectional light beam and the optical mount is located on the tracking base, and the tracking target includes the sensor to detect the unidirectional light beam.

In one embodiment, the optical mount is located on an annular member arranged for controlled rotation about the axis of rotation (i.e. transmission axis of the bidirectional light beam).

In one embodiment, the sensor is a position displacement sensor (PDS).

In another broad form, the present invention seeks to provide a method of tracking the position and orientation of an object in an environment using a tracking system including:
  a) a tracking base positioned in the environment;
  b) a tracking target mountable to the object, wherein in use the tracking base is linked to the tracking target by:
    i) a bidirectional light beam transmitted therebetween; and,
    ii) a unidirectional light beam transmitted therebetween, said unidirectional light beam parallel to the bidirectional light beam; and, wherein the method includes in at least one controller:
      (1) receiving signals from a sensor housed in at least one of the tracking base and the tracking target that detects the unidirectional light beam; and,
      (2) determining a roll angle of the tracking target relative to the tracking base at least in part using the received signals.

In one embodiment, the method includes in the at least one controller:
  a) determining a displacement of the unidirectional light beam relative to a datum position on a surface of the sensor using the received signals; and, b) determining a roll angle using the determined displacement.

In one embodiment, the tracking system includes an optical mount through which the unidirectional light beam transits, the optical mount mounted on at least one of the tracking base and tracking target, the optical mount housing the sensor and configured for controlled rotation about an axis of rotation that is coaxial with the bidirectional light beam, and wherein the method further includes in the at least one controller:
  a) processing the signals received from the sensor to determine the location of the unidirectional light beam incident on the sensor surface; and,
  b) causing the optical mount to rotate about the axis of rotation in accordance with the processed signal so as to locate the unidirectional light beam on the centre of the sensor surface and maintain linkage of the unidirectional light beam transmitted between the tracking base and the tracking target.

This invention provides advantages for the dynamic measurement and control of industrial and construction robots, particularly those with active or dynamic motion compensation and stabilisation. This invention also provides accurate real time roll angle measurement of an active target sensor, overcoming the shortfalls of the above described background art.

Thus, in one aspect, the invention separately provides an improved laser tracker with an active target. The laser tracker has its known primary laser beam and heading angle and altitude angle tracking and measuring provisions and is additionally provided with a second laser beam to provide a roll angle reference. The active target uses known means to track the primary laser beam and measure heading angle and altitude angle. In a preferred embodiment, the active target is further provided with a laser position displacement sensor (PDS) mounted to rotate about a controlled roll axis coincident with the primary laser tracker beam so that the roll axis rotates to zero the PDS, thereby providing a roll angle.

In an alternative embodiment, the active target is further provided with a laser position displacement sensor (PDS) which measures the displacement of the roll beam relative to a datum position, thereby providing a roll angle. This arrangement has the advantage of not requiring the active roll axis but it does require a larger PDS and if the PDS does not extend through 360 degrees it limits the roll angle that can be measured. If a large PDS is used, it reduces the roll angle accuracy. For small roll angles, a smaller and more accurate PDS can be used.

A PDS (position displacement sensor) is an analogue device which provides a real time signal proportional to the location of the centre of the incident laser beam. Commercially available PDS have good repeatability and analog resolution with low noise and accuracy of better than 0.1% of the size of the sensor. By using a small sensor, the position accuracy is high. The PDS signal in the preferred embodiment is used as feedback to control the roll axis to keep the roll laser beam centred on the PDS. The PDS measurements can be read by the control system via an ADC (analog to digital converter) which can operate at the cyclic control rate of the controller, thereby effectively eliminating latency.

The laser tracker is connected to and communicates over a network (e.g. a fieldbus network such as Ethercat) and the active target is connected to and communicates over the same network. Preferably the servo drives used to move the axes are connected to and controlled by, and communicate encoder measurements, directly over the network. Preferably all sensors communicate directly over the network.

Preferably the control algorithms are implemented as library code executed by a networked master PLC. By this means the laser tracker and active target are tightly integrated so that there is minimal latency between the measurements and machine axis compensation control based on those measurements.

To control active dynamic compensation of robot end effector position and orientation on the end of a boom requires fast data with low or preferably no latency (delay). Preferably the measurements can be provided at 1 kHz with orientation accuracy of 0.001 degree and an absolute position accuracy of approximately 0.2 mm throughout a 40 m radius working envelope. Preferably the orientation sensor acts continuously. Preferably the system provides measurement data with low noise so that the motion compensation system is not subjected to vibratory noise. Preferably the measurements have a low latency so that the motion compensation does not have much lag and provides prompt position correction.

In accordance with one aspect of the invention there is provided position and orientation measurement apparatus having a first head unit and a second head unit, said first head unit and said second head unit being linked in use by a bidirectional light beam transmitted therebetween; wherein said first head unit and said second head unit are linked in use by a unidirectional light beam transmitted therebetween, aligned in parallel with said bidirectional light beam, wherein said unidirectional light beam transits an optical mount mounted for controlled rotation about an axis, coaxially with said bidirectional light beam on at least one of said first head unit and said second head unit, wherein a controller maintains said controlled rotation in order to maintain linkage of said unidirectional light beam transmitted between said first head unit and said second head unit and the angle of said controlled rotation is determined by said controller and roll angle data is derived therefrom. In this manner, if one of said first head unit and said second head unit rotates about a notional axis of said bidirectional light beam, the controller rotates the optical mount to maintain connection of the unidirectional light beam, and the roll angle can be determined with very little latency.

In one embodiment, the controller maintains said controlled rotation in order to maintain linkage of said unidirectional light beam transmitted between said first head unit and said second head unit, preferably by controlling a direct drive brushless AC servo motor to rotate and accurately align the optical mount, and using a sensor, preferably a position displacement sensor, to accurately locate the centre of the unidirectional beam.

In one embodiment, the angle of said controlled rotation is determined by said controller from angle encoders and roll angle data is derived therefrom.

In one embodiment, the angle of said controlled rotation includes a correction of following error as determined by a measurement signal from the sensor.

In one embodiment, preferably the angle of said controlled rotation is determined from stepper motor control data.

In one embodiment, the bidirectional light beam is a retro reflective arrangement being preferably transmitted from said first head unit and reflected back by said second head unit. The bidirectional light beam and the unidirectional light beam should be non-diverging such as that derived from coherent sources or laser elements such as laser light emitting diodes, for greatest accuracy.

In one embodiment, the bidirectional light beam is that typically transmitted between a laser tracker sender/receiver unit and an active target utilised in a laser tracker. The first head unit may contain the laser tracker sender/receiver unit, and the second head unit may contain the active target. Position and orientation data is obtained from the laser tracker in known manner, and is supplemented by roll angle data determined by the controller.

In one embodiment, said first head unit is mounted to a first base about two axes normal to each other said second head unit is mounted to a second base about two axes normal to each other. Rotation about the two axes in both head units is controlled by a head unit controller to rotate about their respective said two axes to maintain the linkage of said first bidirectional beam. There may be a single head unit controller or a separate head unit controller in each head unit. The function of the controller maintaining controlled rotation in order to maintain linkage of the unidirectional beam may be incorporated into one or both head unit controllers.

In one embodiment, each head unit is typically (though not necessarily—any pivoting mount will work) mounted to a gimbal about a gimbal axis allowing the attitude or altitude of the transmitted beam or reflected beam forming the bidirectional light beam, to be adjusted by said controller. The gimbal is typically mounted to its base (first base or second base as the case may be) about a base axis extending normally to the plane of its base, although this is a relative concept.

In one embodiment, said first base is mounted with its base axis extending vertically, and the first head unit is mounted to its gimbal about a horizontal axis. The controller may control rotation of the gimbal about the base axis and control rotation of the first head unit about its horizontal axis in order to aim the beam emanating from the first head unit to find a reflector in the second head unit.

In one embodiment, the second base is mounted with its base axis extending nominally vertically but this axis may deflect from the vertical due to operation of a robotic arm on which the second base is mounted. The second head unit is mounted to its gimbal about a gimbal axis normal to the second base axis. The controller controls rotation of the gimbal about the second base axis and controls rotation of the second head unit about its gimbal axis in order to receive the beam emanating from the first head unit and by controlling all rotation about both base axes and gimbal axes, reflects the beam back to the first head unit and establishes the bidirectional light beam.

In one embodiment, said first head unit is mounted to a first gimbal about a first gimbal axis extending normally to the direction of said bidirectional light beam, said first gimbal is mounted to said first base about a first base axis extending normally to said first gimbal axis; and said second head unit is mounted to a second gimbal about a second gimbal axis extending normally to the direction of said bidirectional light beam, said second gimbal is mounted to said second base about a first base axis extending normally to said first gimbal axis.

In one embodiment, a further unidirectional light beam is transmitted preferably from a fixed position in or on the first head unit, transmitted parallel with the bidirectional light beam. This unidirectional light beam is received by a detector located in the optical mount. In one embodiment, if there is deflection of the second base axis from the vertical, the optical mount may be controllably rotated by the controller so that the detector finds the unidirectional light beam (since it is running parallel to the bidirectional light beam) and the controller can by measuring the rotation of the optical mount, derive roll data for the second head unit, and what it is attached to (e.g. a robotic arm, the base of an end effector, or indeed part of an end effector). In practice once both the bidirectional light beam is established, and the unidirectional light beam is detected, the controller can actuate the optical mount to continually follow the unidirectional light beam as a robotic arm moves, and provide continual roll data.

The arrangement in the above paragraph may be varied in that the further unidirectional light beam could be transmitted preferably from a fixed position in or on the second head unit, and the optical mount may be mounted for controlled rotation on the first head unit.

Either arrangement may be varied by having the detector for the unidirectional light beam mounted in a fixed position, and the unidirectional light beam could be mounted within the optical mount.

In an atypical application the first base may be mounted on a robotic arm, and the first base axis may not necessarily be disposed vertically, however the first gimbal axis will always be disposed normal to the first base axis. The second head unit may be mounted with its second base on the ground, with its second base axis disposed vertically.

In all cases, light beams, both that used to establish the bidirectional light beam and the unidirectional light beam, are transmitted normally to the gimbal axis of the head unit in which they are mounted.

All angle measurements may be made from angle encoders either associated with drive motors controlled to maintain beam linkage between said first head unit and said second head unit, or associated with the axes about which rotating parts connect.

In one embodiment, a unidirectional light beam source is located in said first head unit to produce said unidirectional light beam, and said optical mount is located on said second head unit and includes a detector to detect said unidirectional light beam.

In one embodiment, a unidirectional light beam source is located in said second head unit to produce said unidirectional light beam, and said optical mount is located on said first head unit and includes a detector to detect said unidirectional light beam.

In one embodiment, a unidirectional light beam source to produce said unidirectional light beam is located in said optical mount and said optical mount is located on said second head unit, and said first head unit includes a detector to detect said unidirectional light beam.

In one embodiment, a unidirectional light beam source to produce said unidirectional light beam is located in said optical mount and said optical mount is located on said first head unit, and said second head unit includes a detector to detect said unidirectional light beam.

In one embodiment, said optical mount is located on an annular member arranged for controlled rotation coaxially with the extent of travel of said bidirectional light beam.

In one embodiment, said bidirectional light beam is transmitted along said axis.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Examples of the present invention will now be described with reference to the accompanying drawings, in which.

DETAILED DESCRIPTION OF THE PREFERRED EMBODIMENTS

Figure 1A:
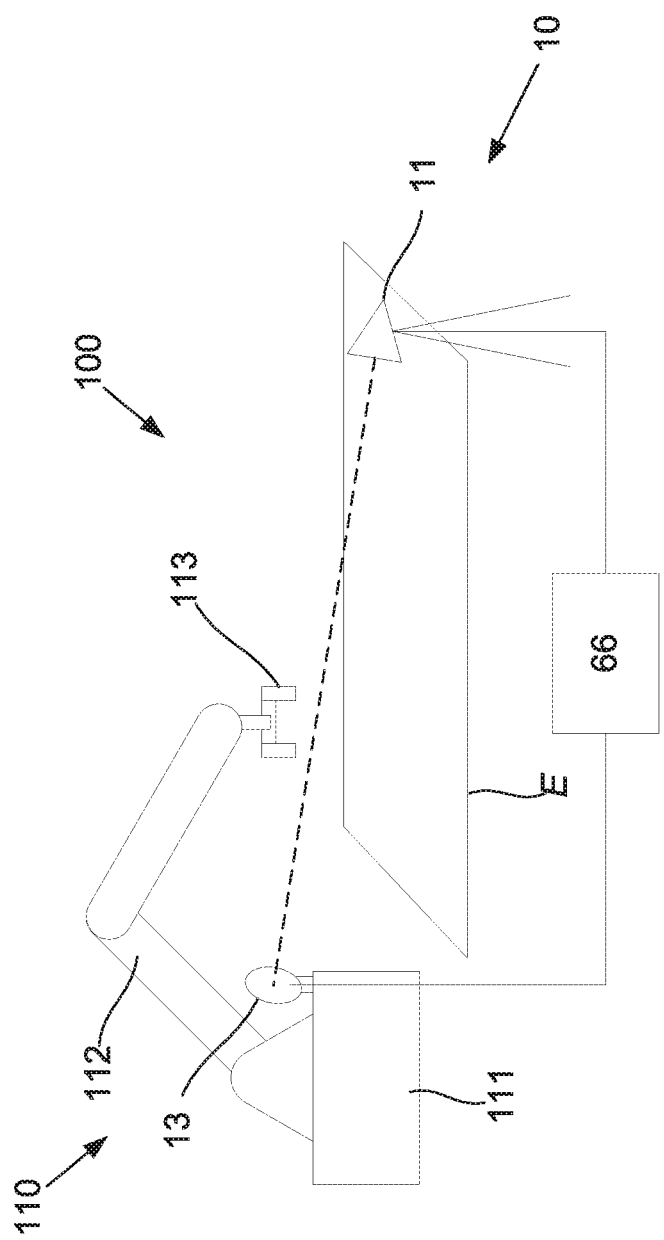
FIG. 1A is a schematic diagram of a system for performing interactions in an environment having a robot assembly and a position and orientation tracking system.

An example of a tracking system 10 for tracking the position and orientation of an object in an environment will now be described with reference to FIGS. 1A to 1D.

In this example, it is to be understood that the tracking system 10 usually forms part of a system 100 for performing interactions in the environment. The system 100 may include for example a robot assembly 110 having a robot base 111 which supports a robot arm 112 and end effector 113 programmed to perform interactions within the environment. The robot assembly 110 is positioned relative to an environment E, which in this example is illustrated as a 2D plane, but in practice could be a 3D volume of any configuration. In use, the end effector 113 is used to perform interactions within the environment E, for example to perform bricklaying, object manipulation, or the like. The robot base 111 is typically a moveable robot base that may for example be mounted to a boom structure or the like which may extend between 3-30 m thereby enabling the end effector 113 to work inside a large work volume. The object being tracked may be any component of the robot assembly 110 including for example the robot base 111, the robot arm 112 and the end effector 113.

For purposes of clarity it is to be understood that typically the tracking system 10 is able to track the robot assembly movement, and in one particular example, movement of the robot base relative to the environment. In one example, the tracking system includes a tracking base 11, which is typically statically positioned relative to the environment E and a tracking target 13, mounted on the robot base 111, allowing a position and orientation of the robot base 111 relative to the environment E to be determined. In other examples, the tracker target 13 may be positioned on another part of the robot assembly 110, including for example on a robot component, such as the robot arm 112 or end effector 113 so that the position and orientation of at least part of the robot is measured.

The term "interaction" is intended to refer to any physical interaction that occurs within, and including with or on, an environment. Example interactions could include placing material or objects within the environment, removing material or objects from the environment, moving material or objects within the environment, modifying, manipulating, or otherwise engaging with material or objects within the environment, modifying, manipulating, or otherwise engaging with the environment, or the like.

The term "environment" is used to refer to any location, region, area or volume within which, or on which, interactions are performed. The type and nature of the environment will vary depending on the preferred implementation and the environment could be a discrete physical environment, and/or could be a logical physical environment, delineated from surroundings solely by virtue of this being a volume within which interactions occur. Non-limiting examples of environments include building or construction sites, parts of vehicles, such as decks of ships or loading trays of lorries, factories, loading sites, ground work areas, or the like.

A robot arm is a programmable mechanical manipulator. In this specification a robot arm includes multi axis jointed arms, parallel kinematic robots (such as Stewart Platform, Delta robots), spherical geometry robots, Cartesian robots (orthogonal axis robots with linear motion) etc.

A boom is an elongate support structure such as a slewing boom, with or without stick or dipper, with or without telescopic elements, telescoping booms, telescoping articulated booms. Examples include crane booms, earthmover booms, truck crane booms, all with or without cable supported or cable braced elements. A boom may also include an overhead gantry structure, or cantilevered gantry, or a controlled tensile truss (the boom may not be a boom but a multi cable supported parallel kinematics crane (see PAR systems, Tensile Truss-Chernobyl Crane)), or other moveable arm that may translate position in space.

An end effector is a device at the end of a robotic arm designed to interact with the environment. An end effector may include a gripper, nozzle, sand blaster, spray gun, wrench, magnet, welding torch, cutting torch, saw, milling cutter, router cutter, hydraulic shears, laser, riveting tool, or the like, and reference to these examples is not intended to be limiting.

It will be appreciated that in order to control the robot assembly 110 to accurately position the end effector 113 at a desired location in order to perform an interaction within the environment, it is necessary to be able to accurately determine the position and orientation of a reference point on the robot assembly.

In this example, the tracking system 10 includes a tracking base 11 positioned in the environment and a tracking target 13 mountable to the object. In use, the tracking base 11 is linked to the tracking target 13 by a bidirectional light beam 17 transmitted therebetween, and, a unidirectional light beam 31 transmitted therebetween, said unidirectional 31 light beam parallel to the bidirectional light beam 17. The bidirectional light beam 17 (e.g. a laser beam) is typically transmitted from the tracking base 11 to the tracking target 13. The tracking target 13 is configured to reflect the beam back to the tracking base 11. This enables the distance between the tracking base 11 and tracking target 13 to be determined and along with the pan and tilt of the tracking base 11, the position of the tracking target 13 can be determined. The tracking target 13 typically includes actuators to pitch and yaw so as to mutually track the tracking base 11 and keep locked onto the bidirectional light beam 17.

The unidirectional light beam 31 (or roll beam) provides a roll angle reference. In this regard, the tracking system 10 also includes at least one controller 66 configured to determine a roll angle of the tracking target 13 relative to the tracking base 11, the roll angle determined at least in part by signals received from a sensor housed in at least one of the tracking base 11 and the tracking target 13 that detects the unidirectional light beam 31. The at least one controller 66 may be a dedicated tracking system controller or alternatively the controller 66 may be a machine controller which also controls moves of a robot or the like to which the target is mounted.

The at least one controller 66 typically includes an electronic processing device, operating in conjunction with stored instructions, and which operates to receive signals from the tracking base and tracking target, process signals to determine position and orientation data and generate control signals for actuators such as motors and the like to execute beam steering and maintain linkage of the respective light beams between the base and target. The electronic processing device could include any electronic processing device such as a microprocessor, microchip processor, logic gate configuration, firmware optionally associated with implementing logic such as an FPGA (Field Programmable Gate Array), or any other electronic device, system or arrangement.

Typically, the sensor is a position displacement sensor (PDS) which is an analog device which provides a real time signal proportional to the location of the centre of the incident laser beam on a surface thereof. Commercially available PDS have good repeatability and analog resolution with low noise and accuracy of better than 0.1% of the size of the sensor. By using a small sensor, the position accuracy is high. The PDS measurements can be read by the control system via an ADC (analog to digital converter) which can operate at the cyclic control rate of the controller, thereby effectively eliminating latency.

The above described tracking system 10 provides an improved roll angle measurement which provides a number of advantages. Firstly, orientation measurement accuracy for roll is increased enabling accuracy in the order of 0.001 degree or better to be achieved depending on the sensor size. This in turn can enable an absolute position accuracy of approximately 0.2 mm throughout a 40 m radius working envelope. This is significantly better than the 0.1 or 0.01 degree that the currently available laser tracking systems are able to achieve. This is important as the further the end effector is from the position where a tracking target is mounted, the greater the end effector positional error due to orientation measurement error.

Furthermore, measurements of this degree of accuracy can be provided at least 1 kHz as the roll measurements can be read at the cyclic rate of the controller which may have a 1 ms clock cycle for example. Very accurate and continuous roll measurements with minimal latency are therefore achievable which enables real time dynamic motion compensation to be implemented. To control dynamic motion compensation of the robot end effector position and orientation on the end of a moveable boom requires fast data with low or preferably no latency (or delay). By reducing latency, the motion compensation does not have much lag and provides prompt position and orientation correction. Finally, the tracking system is also able to provide measurement data with low noise so that the motion compensation system is not subjected to vibratory noise.

A number of further features will now be described.

In one example, the sensor measures the displacement of the unidirectional light beam relative to a datum position on a surface thereof. The roll angle is then determined from the measured displacement. If only a small roll angle needs to be measured (e.g. a few degrees) then a small enough sensor (e.g. PDS) can be used to provide highly accurate measurements in order of 0.001 degree or better. However, in systems where the target may experience a significant amount of roll, a larger PDS would be required and if the PDS does not extend through 360 degrees it limits the roll angle that can be measured. If a large PDS is used, it also reduces the roll angle accuracy. However, for systems where roll is minimal, this implementation is straightforward as it does require any moving parts that other arrangements require as will be described below.

Figure 1B:
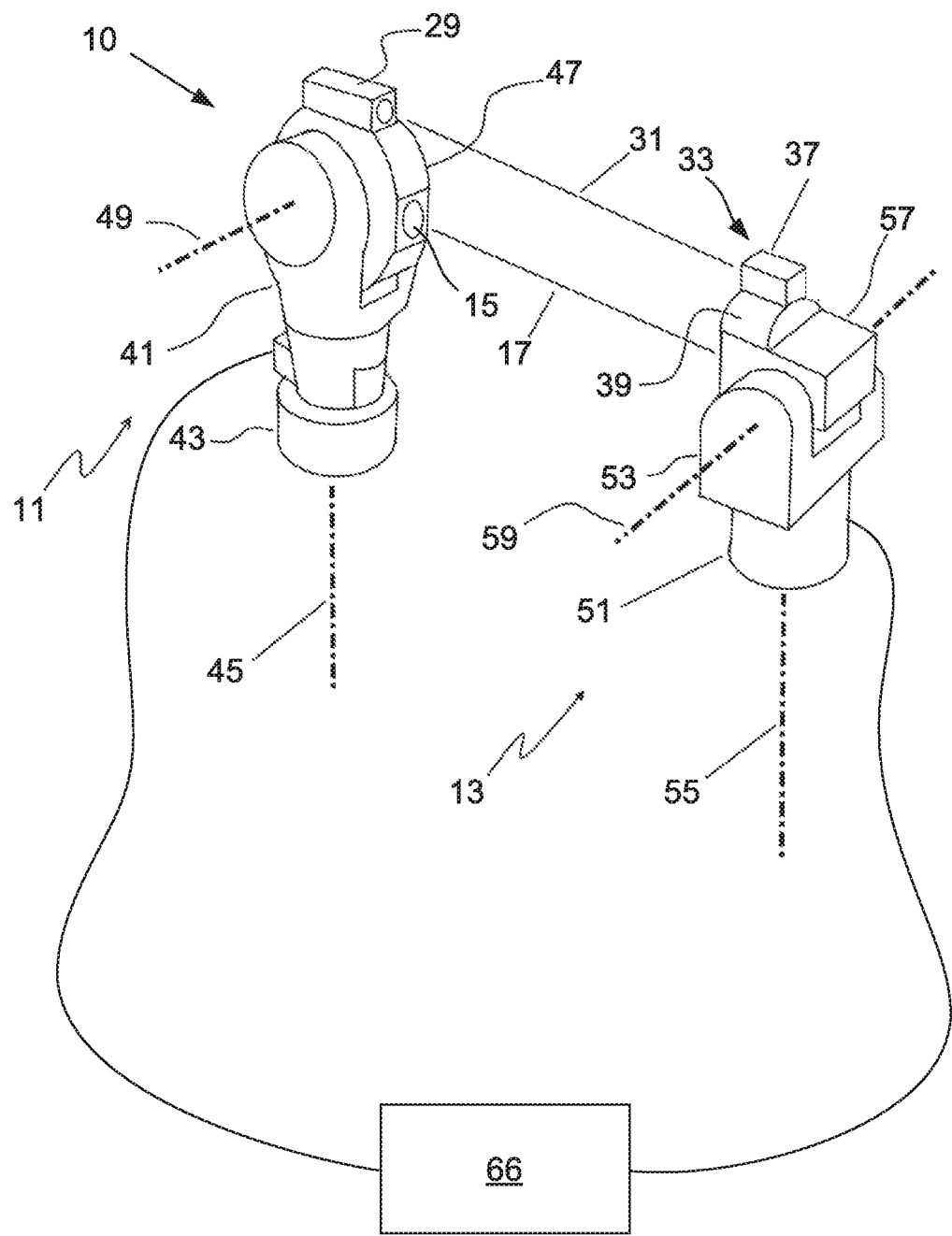
FIG. 1B is a schematic perspective view of a first example of a position and orientation tracking system having a tracking base and a tracking target.
Figure 1C:
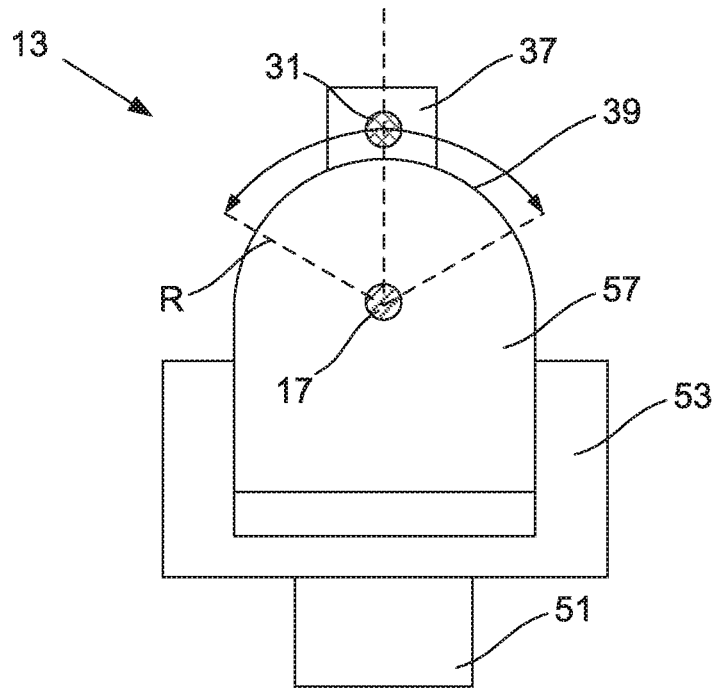
FIGS. 1C to 1D are schematic front views of a tracking target from the position and orientation tracking system of FIG. 1B illustrating the target having a roll angle of zero degrees and a degrees respectively.
Figure 1D:
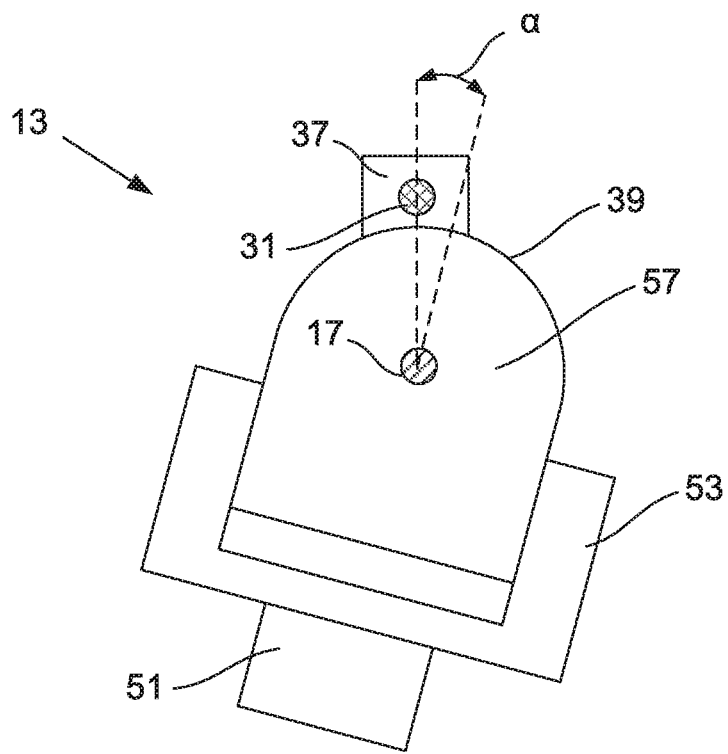

In the example shown in FIGS. 1B to 1D, the unidirectional light beam 31 transits an optical mount 37 mounted on at least one of the tracking base 11 and tracking target 13 (in this case the tracking target 13) for controlled rotation about an axis of rotation that is coaxial with the bidirectional light beam 17, and wherein the controller is configured to control the rotation of the optical mount 37 in order to maintain linkage of the unidirectional light beam 31 transmitted between the tracking base 11 and the tracking target 13 and wherein the angle of the controlled rotation is determined by the controller and roll angle data derived therefrom.

Typically, the sensor is housed in the optical mount and wherein the sensor provides signals proportional to the location of the unidirectional light beam incident on a surface of the sensor. In FIG. 1C, the tracking target 13 is shown in a nominally upright position in which the optical mount 37 is disposed centrally with respect to curved surface 39 of a tracking head unit 57 about which the optical mount 37 rotates. This position is indicative of zero roll angle. In FIG. 1D, the tracking target 13 is shown having a roll angle $\alpha$. It can be seen that as the tracking target 13 rolls (e.g. due to the object it is mounted on undergoing roll) the optical mount 37 rotates in the opposing direction about a roll axis coincident with the bidirectional light beam 17. The optical mount 37 rotates to ensure that the unidirectional light beam 37 always remains centred on the sensor which zeros the PDS.

Typically, the controller receives the signals from the sensor, processes the signals to determine the location of the unidirectional light beam incident on the sensor surface; and, causes the optical mount to rotate about the axis of rotation in accordance with the processed signals so as to locate the unidirectional light beam on the centre of the sensor surface and maintain linkage of the unidirectional light beam transmitted between the tracking base and the tracking target.

In this regard, a motor may be coupled to the optical mount and wherein the controller is configured to control the motor to rotate and align the optical mount with the unidirectional light beam.

The angle of the controlled rotation which is indicative of the roll angle may be determined in a at least two ways. In one example, the angle of said controlled rotation is determined by said controller from angle encoders and roll angle data is derived therefrom. Alternatively, the angle of said controlled rotation is determined from motor control data. Furthermore, the angle of said controlled rotation may include a correction of following error as determined by a measurement signal from the sensor.

It will be appreciated that preferably the tracking base is a laser tracker and the tracking target is an active target configured to track the tracking base so as to maintain linkage of the bidirectional light beam transmitted between the laser tracker and active target.

Typically, the tracking base includes a first head unit mounted to a first base about two axes normal to each other and wherein the tracking target includes a second head unit that is mounted to a second base about two axes normal to each other, wherein rotation about the two axes in both head units is controlled by a head unit controller to rotate about their respective said two axes to maintain the linkage of said bidirectional light beam. The ability for the second head unit to rotate about its axes to follow the first head unit enables for example the active target to determine its own yaw and pitch.

In one example, the first head unit is mounted to a first gimbal about a first gimbal axis extending normally to the direction of the bidirectional light beam, the first gimbal being mounted to the first base about a first base axis extending normally to the first gimbal axis; and the second head unit is mounted to a second gimbal about a second gimbal axis extending normally to the direction of the bidirectional light beam, the second gimbal being mounted to the second base about a second base axis extending normally to said second gimbal axis. Whilst a gimbal system may be used, in practice any suitable pivoting mount may be used to mount the respective head units of the tracking base and tracking target.

A number of different permutations of the tracking system are envisaged.

In one arrangement, a unidirectional light beam source is located in the tracking base to produce said unidirectional light beam, and said optical mount is located on the tracking target, the optical mount further including the sensor to detect the unidirectional light beam.

In another arrangement, a unidirectional light beam source is located in the tracking target to produce the unidirectional light beam, and said optical mount is located on the tracking base, the optical mount further including the sensor to detect the unidirectional light beam.

In a further arrangement, a unidirectional light beam source is located in the optical mount to produce the unidirectional light beam and the optical mount is located on the tracking target, and the tracking base includes the sensor to detect the unidirectional light beam.

In yet a further arrangement, a unidirectional light beam source is located in the optical mount to produce the unidirectional light beam and the optical mount is located on the tracking base, and the tracking target includes the sensor to detect the unidirectional light beam. From the above, it will be appreciated therefore the unidirectional light beam source (i.e. roll beam laser) may be located in either the tracking base or tracking target and likewise for the optical mount and sensor.

The optical mount may be arranged in a number of ways as well. It may be housing configured to rotate about a curved surface of one of the head units or alternatively the optical mount may be located on an annular member arranged for controlled rotation about a transmission axis of the bidirectional light beam.

In another broad form, the present invention provides a method of tracking the position and orientation of an object in an environment using a tracking system including: a tracking base positioned in the environment; a tracking target mountable to the object, wherein in use the tracking base is linked to the tracking target by: a bidirectional light beam transmitted therebetween; and, a unidirectional light beam transmitted therebetween, said unidirectional light beam parallel to the bidirectional light beam; and, wherein the method includes in at least one controller: receiving signals from a sensor housed in at least one of the tracking base and the tracking target that detects the unidirectional light beam; and, determining a roll angle of the tracking target relative to the tracking base at least in part using the received signals.

In one example, the method further includes in the at least one controller: determining a displacement of the unidirectional light beam relative to a datum position on a surface of the sensor using the received signals; and, determining a roll angle using the determined displacement.

In another example, the tracking system includes an optical mount through which the unidirectional light beam transits, the optical mount mounted on at least one of the tracking base and tracking target, the optical mount housing the sensor and configured for controlled rotation about an axis of rotation that is coaxial with the bidirectional light beam, and wherein the method further includes in the at least one controller: processing the signals received from the sensor to determine the location of the unidirectional light beam incident on the sensor surface; and, causing the optical mount to rotate about the axis of rotation in accordance with the processed signal so as to locate the unidirectional light beam on the centre of the sensor surface and maintain linkage of the unidirectional light beam transmitted between the tracking base and the tracking target.

Figure 3:
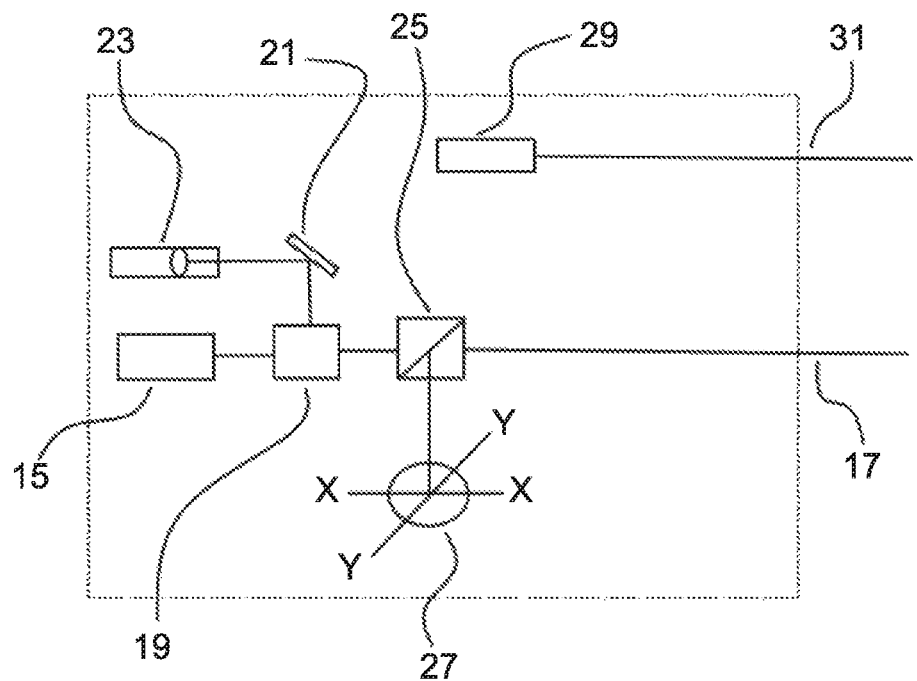
FIG. 3 is a schematic diagram of internal componentry of the tracking base of FIG. 2.

Preferred embodiments of the invention will now be described in further detail. All of the embodiments are improved position and orientation measurement apparatus having a first head unit in the form of a laser tracker 11 and a second head unit in the form of an active target sensor 13, incorporating improved roll angle measuring. The laser tracker 11 has a primary laser 15 which generates a primary laser beam 17 which is reflected back by the active target sensor 13, forming the bidirectional laser beam. Referring to FIG. 3, the laser tracker 11 includes a single beam interferometer 19 and mirror 21 reflecting part of the primary laser beam 17 to a fringe counter 23, from which range data is acquired. A 50% beam splitter 25 sends part of the primary laser beam 17 to a dual axis lateral effect photodiode or dual axis position displacement sensor 27 to derive data for "steering" the laser tracker primary laser beam 17, in order to accurately aim at the active target sensor 13.

The laser tracker 11 also has a second laser 29 arranged to send a unidirectional second laser beam 31 in parallel with the primary laser beam 17, to a roll position displacement sensor 33 located on the active target sensor 13. In the first embodiment, the roll position displacement sensor 33 comprises a position displacement sensor 35 located within a housing 37 mounted on a curved surface 39 for rotation so that the position displacement sensor 35 rotates with the primary laser beam 17. The housing 37 mounted on a curved surface 39 rotates about the same axis as the line of travel of the primary laser beam 17 (i.e. transmission or roll axis), when correctly aligned to be reflected back by the active target sensor 13. The curved surface denotes a surface about which rotation of the housing 37 through 120 degrees occurs, about the transmission axis, making this embodiment suitable for use in applications where roll sensing is limited to plus or minus 60 degrees from the central position of the housing 37. An angle encoder produces a signal to indicate the angle at which the housing 37 is disposed, thus providing roll angle measurement of the active target sensor 13.

The laser tracker 11 is supported on a yoke 41 that rotates on a support 43 about a substantially vertical heading axis 45. The yoke 41 rotatably supports a head 47 that rotates about a horizontal altitude axis 49. The head 47 contains the primary laser 15, the single beam interferometer 19 and mirror 21, the fringe counter 23, the 50% beam splitter 25, and the sensor 27, and supports the second laser 29.

The laser tracker primary beam optics include the primary laser 15, and the single beam interferometer 19 and fringe counter 23, but as an alternative to the single beam interferometer 19 and fringe counter 23, may include a time of flight ADM (automated distance measurer), or a combination of both. The laser tracker primary beam optics also include the 50% beam splitter 25 and the sensor 27, which as discussed above can be selected from a dual axis PDS (position displacement sensor) or a dual axis lateral effect photo diode, but as a further alternative may utilise a CCD or CMOS sensor array with associated circuitry. Data derived from the sensor is processed and used to control brushless AC servo motors 50 to move the yoke 41 relative to the support 43, and to move the head 47 relative to the yoke 41. Angle encoders associated with the servo motors 50 measure the angle of rotation and this data is used to provide attitude and heading data, additional to the distance data determined from analysis of the fringe counter 23 data which then enables the position of the target to be determined. While brushless AC servo motors 50 are most preferred, alternative embodiments may utilise DC servo motors or stepper motors or other suitable drive motors.

Figure 2:
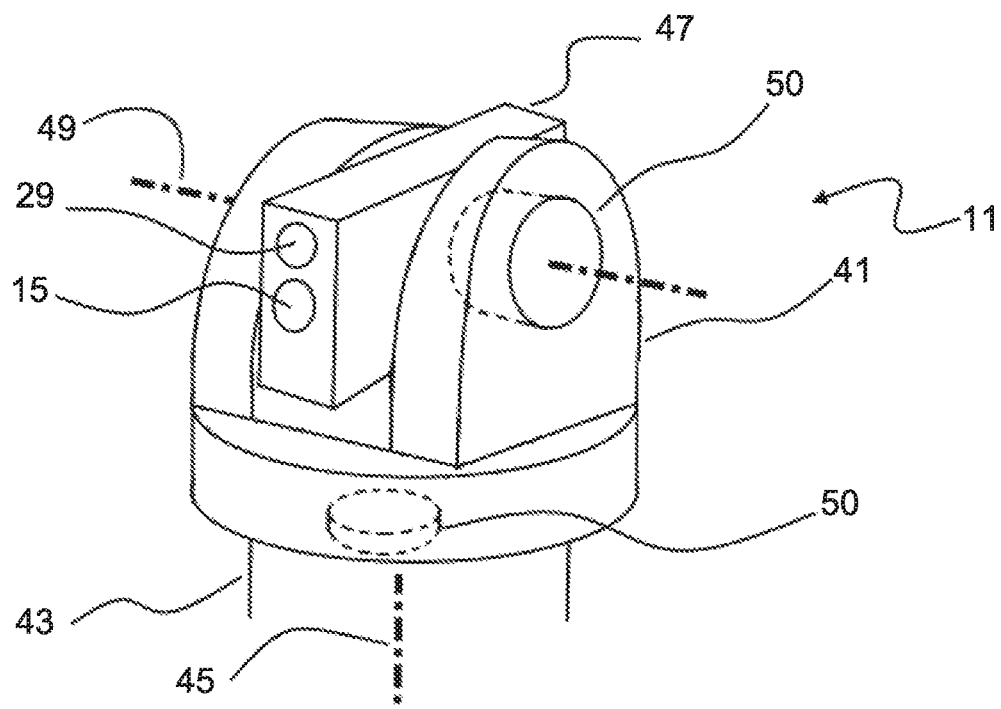
FIG. 2 is a schematic perspective view of an example of a tracking base for use in a second example of a position and orientation tracking system.

An alternative embodiment of laser tracker 11 is illustrated in FIG. 2. This differs from the laser tracker shown in FIG. 1B only in the more compact shape and configuration of the yoke 41 and head 47.

In both arrangements of laser tracker 11, the roll laser 29 is provided with calibration means to align its beam 31 to be parallel to the primary laser beam 17, which would be a setting that is adjusted during manufacture, but would not be expected to be adjusted in field.

Referring back to FIG. 1B, the active target sensor 13 has a base 51 that is mounted to the target object which is to be tracked (e.g. robot base 111 shown in FIG. 1A). The base 51 rotatably supports a yoke 53 that rotates about a first axis 55. The yoke 53 has a clevis that supports a head 57 for rotation about a second axis 59, normal to the first axis 55. The head 57 has the curved surface 39 located on the top thereof.

Figure 5:
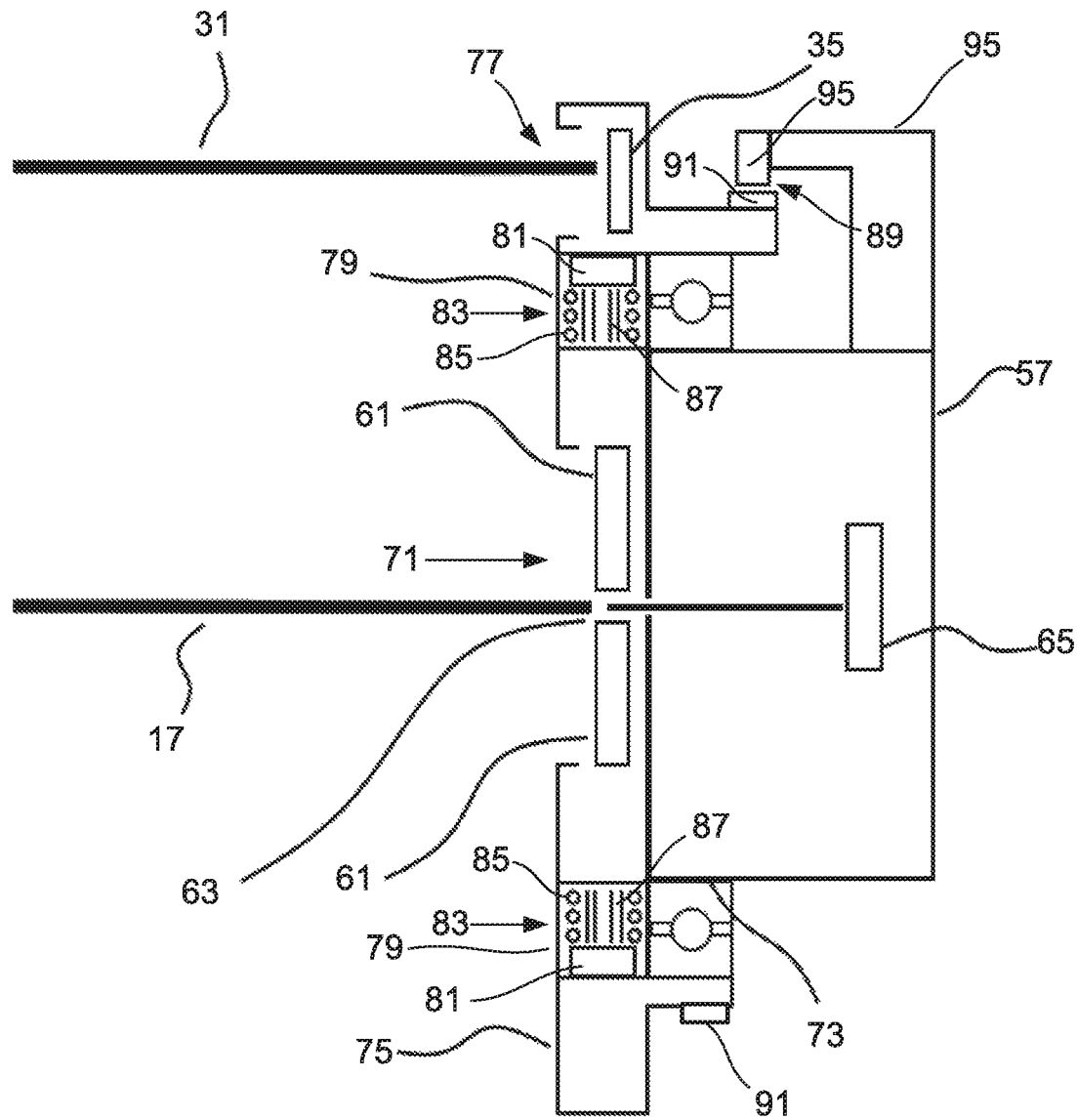
FIG. 5 is a schematic cross-sectional view showing internal componentry of the tracking target of FIG. 4.
Figure 7:
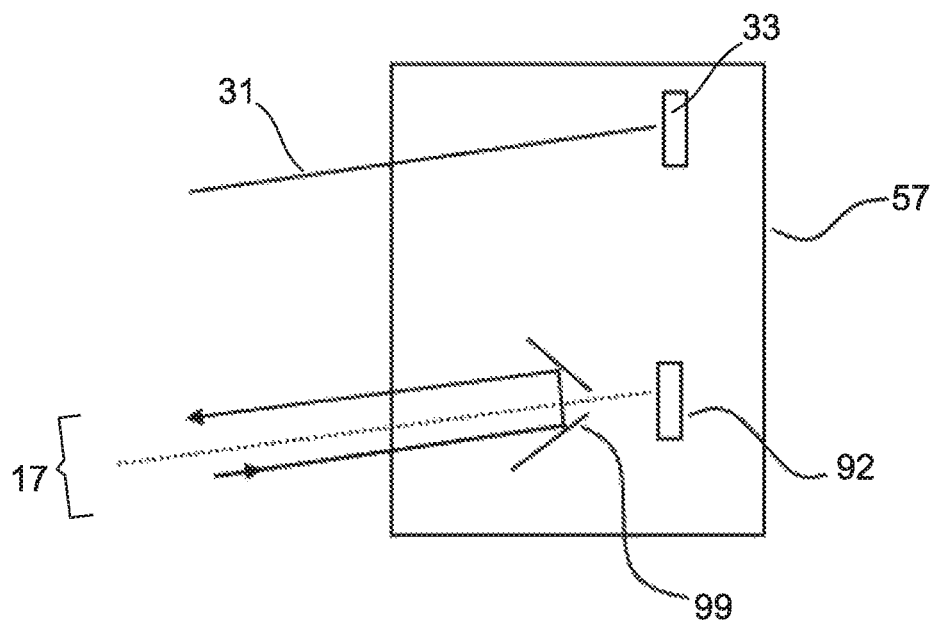
FIG. 7 is a schematic diagram showing the internal componentry of the tracking target of FIG. 6; and, FIG. 8 is a flowchart of an example process for tracking the position and orientation of an object in an environment.

The head 57 supports internal equipment to sense the primary laser beam 17. Details of two different embodiments of this are shown in FIGS. 5 and 7. Referring to FIG. 5, in one arrangement, typically this can include a mirror 61 with a pin hole 63, behind which is located a dual axis position displacement sensor 65. The mirror 61 can reflect most of the primary laser beam 17 back to the laser tracker 11, while some of the primary laser beam 17 passes through the pin hole 63 to reach the dual axis position displacement sensor 65. Signals from the position displacement sensor 65 are fed to a controller 66 which controls brushless AC servo motors controlling the positioning of the yoke 53 and the positioning of the head 57 so that the mirror 61 is aligned to reflect the primary laser beam 17 back to the laser tracker 11.

Figure 4:
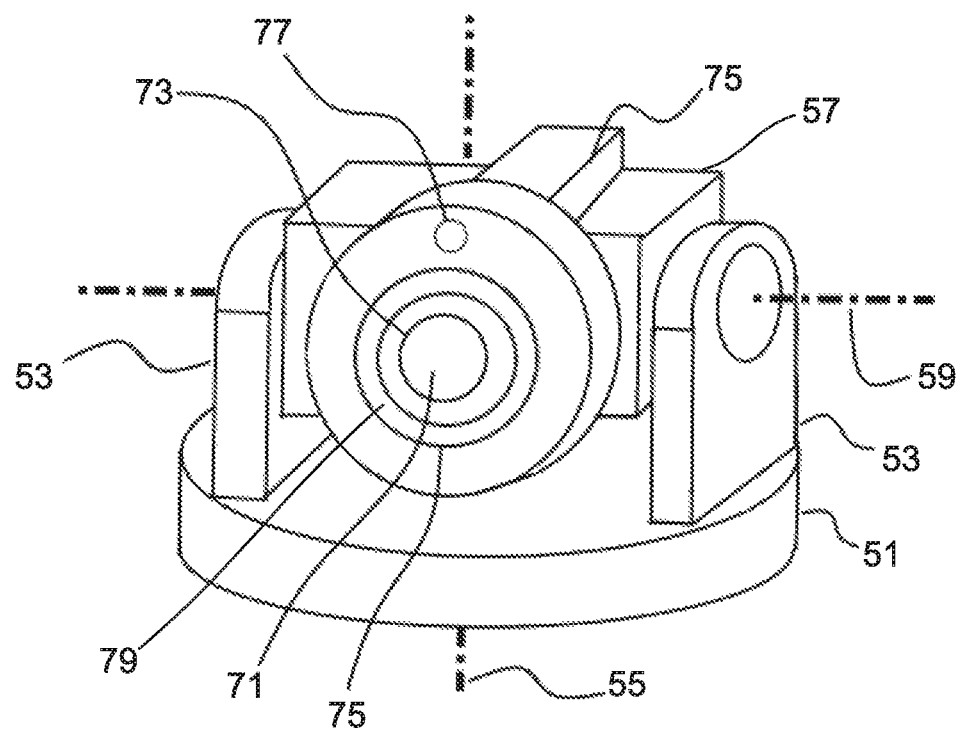
FIG. 4 is a schematic perspective view of an example of a tracking target for use in the second example of a position and orientation tracking system.

An embodiment of the active target sensor 13 is shown in FIGS. 4 and 5. The active target sensor 13 has base 51 that is mounted to the target object which is to be tracked (not shown). The base 51 rotatably supports yoke 53 that rotates about first axis 55. The yoke 53 has a clevis that supports the head 57 for rotation about second axis 59, normal to the first axis 55. The primary laser beam 17 passes through a window 71 to reach the internal equipment to sense and reflect it, comprising the mirror 61 with pin hole 63, behind which is located a dual axis position displacement sensor 65, shown in FIG. 5. The window 71 is mounted on the exposed end of a cylindrical housing 73 about which is mounted for controlled rotation an annular housing 75 with a window 77 for the unidirectional second laser beam 31 to pass to reach the position displacement sensor 35. An annular servo motor 79 rolls the annular housing 75 about the cylindrical housing 73 under feedback control of the position displacement sensor 35 accurately locating the unidirectional second laser beam 31. The annular servo motor is of a brushless outrunner configuration (a well known configuration used in CD drive motors and in brushless electric motors used in model cars and model aircraft amongst other applications) and comprises an even number of permanent magnets 81 arranged in alternating pole fashion (i.e. starting with a magnet arranged with N pole to the inner and S pole to the outer, then the adjacent magnet S to the inner and N to the outer and so on) attached to and extending around the inside of the annular housing 75 (which is preferably ferro magnetic and constructed from steel), and a plurality (in multiples of three) of electromagnet coils 83 shown schematically as coils 85 wound around soft iron or silicon steel laminations 87. A typical annular servo motor in this application might have 18 permanent magnets and nine electromagnet coils arranged as three groups of three coils. An angle encoder 89 comprising an encoder ring 91 mounted on the back of the annular housing 75 and an encoder read head 93 mounted on a support 95, provides accurate roll angle data back to the controller 66.

The controller 66 uses the signal from the position displacement sensor 35 as a feedback signal to control movement of the servo motor 79 to roll the annular housing 75 about its roll axis, to zero the signal from the position displacement sensor 35. The angle encoder 89 associated with the annular housing 75 provides the roll angle measurement back to the controller 66. In its simplest form the roll axis speed is proportional to the position displacement sensor 35 signal so that as the value from the position displacement sensor 35 increases, the speed of the roll axis is increased in proportion to a proportional gain applied to the feedback so as to move the roll axis and the position displacement sensor 35 toward its zero position. In more sophisticated forms of the feedback control, differential gains and integral gains may be applied within the control loop in order to minimise following error.

The roll angle measurement may be made more accurate by adding to the angle encoder angle a following error correction based on the measurement from the position displacement sensor 35. The position displacement sensor 35 may be calibrated by rotating the position displacement sensor 35 about the roll axis and relating the position displacement sensor 35 signal to the encoder angle. Calibration is normally carried out during manufacture or in a lab and not in field conditions.

The arrangements of the active target sensor 13 shown in FIGS. 1, 4 and 5 can be difficult to implement in practice because it is necessary to simultaneously align both the laser tracker 11 and the active target sensor 13. The laser tracker 11 must point the bidirectional beam 17 at the mirror 61 which must be aligned to reflect the bidirectional beam 17 back to the laser tracker 11. This makes set up difficult. Optional video cameras (not shown) may be fitted to the laser tracker 11 or active target sensor 13 to assist with set up alignment. These video cameras may be connected to computer vision processors to automatically recognise and align the laser tracker 17 to the active target sensor 13 and vice versa. An alternative which is easier to set up entails replacing the mirror 61 with a retro reflector as shown in the embodiment illustrated in FIGS. 6 and 7.

Figure 6:
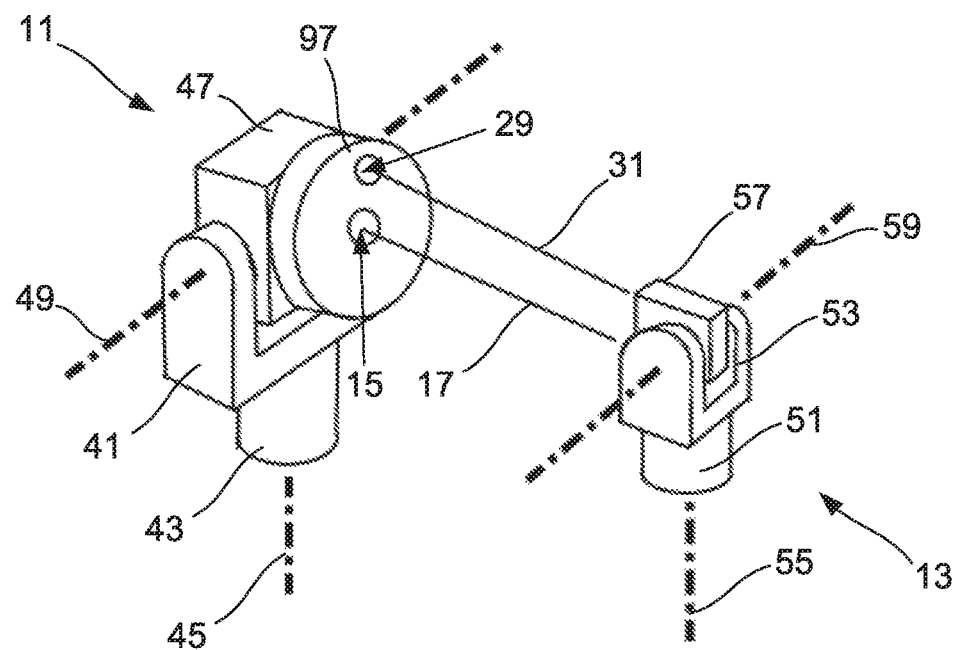
FIG. 6 is a schematic perspective view of a third example of a position and orientation tracking system.

Referring to FIG. 6, another embodiment of the position and orientation tracking system is shown. The position and orientation tracking system has a first head unit in the form of laser tracker 11 and a second head unit in the form of active target sensor 13. This embodiment differs from the previous embodiments in that the roll angle measurement is incorporated in the laser tracker 11.

The laser tracker 11 has a primary laser 15 which generates a primary laser beam 17 which is reflected back by the active target sensor 13, forming the bidirectional laser beam. The internal arrangements for the primary laser beam 17 are the same as in the first and second embodiments, as illustrated in FIG. 3. However, the second laser 29 arranged to send a unidirectional second laser beam 31 in parallel with the primary laser beam 17, is mounted in an annular housing 97 which is mounted for rotation by a brushless AC servo motor. The annular housing 97 has an associated angle encoder 89 to send roll angle data to the controller 66. The second laser beam 31 is transmitted to the roll position displacement sensor 33 located in the active target sensor 13. The annular housing 97 must be rotated to the correct angle for the roll position displacement sensor 33 to detect the second laser beam 31, once the primary laser beam 17 is locked by the laser tracker 11 and the active target sensor 13.

The angle encoder 89 associated with the annular housing 97 produces a signal to indicate the angle at which the annular housing 81 is disposed, thus providing roll angle measurement of the active target sensor 13.

The laser tracker 11 is supported on a yoke 41 that rotates on a support 43 about a substantially vertical heading axis 45. The yoke 41 rotatably supports a head 47 that rotates about a horizontal altitude axis 49. The head 47 contains the primary laser 15, the single beam interferometer 19 and mirror 21, the fringe counter 23, the 50% beam splitter 25, and the sensor 27, and supports the second laser 29 in the annular housing 97.

The active target sensor 13 has an alternative arrangement for sensing the primary laser beam 17 which includes a pin hole retro reflector 99 with a dual axis position displacement sensor 101 located behind. In an alternative embodiment, the pin hole retro reflector 99 may be replaced with a penta-prism.

Signals from the position displacement sensor 101 are fed to the controller 66 which controls stepper motors controlling the positioning of the yoke 53 and the positioning of the head 57 so that the retro reflector 99 is aligned to reflect the primary laser beam 17 back to the laser tracker 11. Data derived from the sensor 27 is processed by the controller 66 and used to control brushless AC servo motors 50 or DC servo motors or stepper motors or other suitable drive motors to move the yoke 41 relative to the support 43, and to move the head 47 relative to the yoke 41. Angle encoders associated with the servo motors 50 measure the angle of rotation and this data is used to provide attitude and heading data, additional to the distance data determined from analysis of the fringe counter 23 data. The positioning of the yoke 53 and the positioning of the head 57 is orientated to point back to the laser tracker 11 by zeroing the beam 17 on the position displacement sensor 101, and data from angle encoders provide pitch and yaw data for the head 57 back to the controller 66. The alignment of the pointing direction, relative to the alignment of the position displacement sensor 101 and the pin hole in the retro reflector 87 is calibrated during manufacture and is not normally field adjusted. The bidirectional laser beam 17 is reflected by the retro reflector 99 back to the laser tracker 11. This alternative arrangement shown in FIG. 7 has the advantage that the laser tracker 11 can be easily aligned to track the retro reflector 99 before the head 57 is oriented to point precisely back to the laser tracker 11. The angle of the head 57 relative to the beams 17 and 31 shown in FIG. 7, is shown in position once the primary laser beam 17 has found the position displacement sensor 101, and prior to the head 57 being aligned by the stepper motors controlling the positioning of the yoke 53 and the positioning of the head 57 so that the retro reflector 99 is exactly aligned to reflect the primary laser beam 17 back to the laser tracker 11, with the primary laser beam 17 incident on the position displacement sensor 89 at exact right angles and at its exact central position.

Optional video cameras (not shown) may be fitted to the laser tracker 11 or active target sensor 13 to assist with the initial set up alignment. These cameras may be connected to computer vision processors to automatically recognise and align the laser tracker 17 to the active target sensor 13 and vice versa.

Laser position displacement sensors are commercially available (e.g. from Hamar), or as discrete optical components and silicon chips (e.g. from On-Trak Photonics). The position displacement sensors 33, 35 are provided with means to adjust their detection radius from the primary beam axis to exactly match the distance (or radius) R of the roll axis laser from the primary beam laser.

Figure 8:
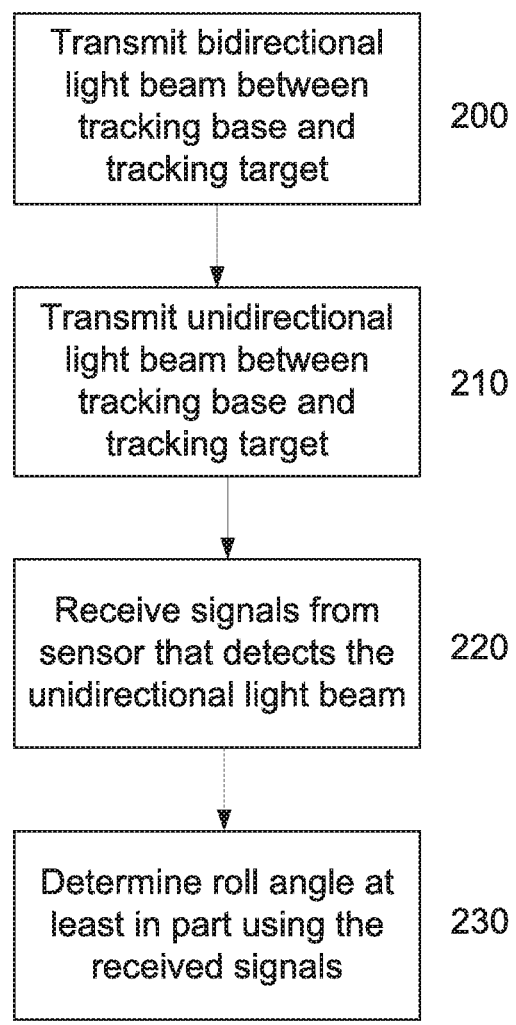

Referring now to FIG. 8, a method of tracking the position and orientation of an object in an environment shall now be described.

In this example, at step 200 the method includes transmitting a bidirectional light beam between a tracking base and a tracking target. Typically, the tracking base includes the bidirectional light beam source which emits the light beam towards the target, which reflects the beam back towards the tracking base. Both the tracking base and tracking target include actuators to steer the beam and typically a mirror located in the target to maintain bidirectional light beam linkage between the base and target.

A step 210, the method includes transmitting a unidirectional light beam between the tracking base and target. Typically, the tracking base includes the unidirectional light beam source which emits the unidirectional light beam towards the target, ensuring that the unidirectional light beam is parallel to the bidirectional light beam. The unidirectional light beam is incident upon a sensor (e.g. a position displacement sensor) housed in the target (or base if the unidirectional beam source is located in the target).

At step 220, at least one controller receives signals from the sensor that detects the unidirectional light beam. The sensor provides a signal proportional to the location of the unidirectional light beam incident on a surface of the sensor. When the light beam is incident on the centre of the sensor, the PDS will be zeroed.

Finally, at step 230 the at least one controller determines the roll angle at least in part using the received signals. In this regard, the signals may be directly indicative of the roll angle, such as the case when the sensor measures the displacement of the unidirectional light beam relative to a datum position on a surface thereof and the roll angle is determined from the measured displacement. In another example, the signals are used as feedback to controllably rotate an optical housing in which the sensor is disposed which rotates in order to zero the PDS as the target rolls. The roll angle is then determined from the amount of controlled rotation of the optical mount.

Accordingly, in at least one of the above described examples a tracking system that provides advantages for the dynamic measurement and control of industrial and construction robots, particularly those with active or dynamic motion compensation and stabilisation is provided. The tracking system provides accurate real time roll angle measurement of an active target sensor, overcoming the shortfalls of the prior art and enabling roll angle to be measured with an accuracy of at least 0.001 degrees at 1 kHz which assists in achieving an absolute position accuracy of a robotic end effector of at least 0.2 mm throughout a 40 m radius working envelope. Roll angle measurement can be provided continuously and with minimal latency therefore making the tracking system suitable for robotic systems where dynamic motion compensation is required.

Further details of the applicants technology are described in patent publications and applications U.S. Pat. No. 8,166,727, PCT/AU2008/001274, PCT/AU2008/001275, PCT/AU2017/050731, PCT/AU2017/050730, PCT/AU2017/050728, PCT/AU2017/050739, PCT/AU2017/050738, PCT/AU2018/050698, AU2017902625, AU2017903310, AU2017903312, AU2017904002, AU2017904110, PCT/AU2018/050698, AU2018902566, AU2018902557, PCT/AU2018/050733, PCT/AU2018/050734, PCT/AU2018/050740, PCT/AU2018/050737 and PCT/AU2018/050739, the contents of which are incorporated herein by cross reference.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A tracking system for tracking a position and orientation of an object in an environment, the tracking system including:
   a) a tracking base positioned in the environment;
   b) a tracking target mountable to the object, wherein in use the tracking base is linked to the tracking target by:
      i) a bidirectional light beam transmitted between the tracking base and the tracking target; and,
      ii) a unidirectional light beam transmitted between the tracking base and the tracking target, the unidirectional light beam parallel to the bidirectional light beam; and,
   c) at least one controller configured to determine a roll angle of the tracking target relative to the tracking base, the roll angle determined at least in part by signals received from a sensor housed in at least one of the tracking base and the tracking target that detects the unidirectional light beam;
   wherein:
   the unidirectional light beam is received by an optical mount mounted on at least one of the tracking base and the tracking target for controlled rotation about an axis of rotation that is coaxial with the bidirectional light beam,
   the controller is configured to control the rotation of the optical mount about the axis of rotation that is coaxial with the bidirectional light beam in order to maintain linkage of the unidirectional light beam transmitted between the tracking base and the tracking target, and
   an angle of the controlled rotation is determined by the controller, and roll angle data is derived from the angle of the controlled rotation.

2. The tracking system according to claim 1, wherein the sensor is housed in the optical mount, and wherein the sensor provides signals proportional to the location of the unidirectional light beam incident on a surface of the sensor.

3. The tracking system according to claim 2, wherein the controller:
   a) receives the signals from the sensor;
   b) processes the signals to determine the location of the unidirectional light beam on the sensor surface; and,
   c) causes the optical mount to rotate about the axis of rotation in accordance with the processed signals so as to locate the unidirectional light beam on the centre of the sensor surface and maintain linkage of the unidirectional light beam transmitted between the tracking base and the tracking target.

4. The tracking system according to claim 3, wherein a motor is coupled to the optical mount, and wherein the controller is configured to control the motor to rotate and align the optical mount with the unidirectional light beam.

5. The tracking system according to claim 4, wherein the angle of the controlled rotation is determined by the controller from motor control data.

6. The tracking system according to claim 1, wherein the angle of the controlled rotation is determined by the controller from angle encoders.

7. The tracking system according to claim 6, wherein the angle of the controlled rotation includes a correction of following error as determined by a measurement signal from the sensor.

8. The tracking system according to claim 1, wherein the optical mount is located on an annular member arranged for controlled rotation about the axis of rotation.

9. The tracking system according to claim 1, wherein a unidirectional light beam source is located in the tracking base to produce the unidirectional light beam, and the optical mount is located on the tracking target, the optical mount further including the sensor to detect the unidirectional light beam.

10. The tracking system according to claim 1, wherein a unidirectional light beam source is located in the tracking target to produce the unidirectional light beam, and the optical mount is located on the tracking base, the optical mount further including the sensor to detect the unidirectional light beam.

11. The tracking system according to claim 1, wherein a unidirectional light beam source is located in the optical mount to produce the unidirectional light beam and the optical mount is located on the tracking target, and the tracking base includes the sensor to detect the unidirectional light beam.

12. The tracking system according to claim 1, wherein a unidirectional light beam source is located in the optical mount to produce the unidirectional light beam and the optical mount is located on the tracking base, and the tracking target includes the sensor to detect the unidirectional light beam.

13. The tracking system according to claim 1, wherein the tracking base is a laser tracker and the tracking target is an active target configured to track the tracking base so as to maintain linkage of the bidirectional light beam transmitted between the laser tracker and active target.

14. The tracking system according to claim 1, wherein the tracking base includes a first head unit mounted to a first base about two first axes normal to each other, and wherein the tracking target includes a second head unit that is mounted to a second base about two second axes normal to each other, and wherein rotation about the first and second axes in the first and second head units is controlled by a head unit controller to rotate the first and second head units about the respective first and second axes to maintain linkage of the bidirectional light beam.

15. The tracking system according to claim 14, wherein the first head unit is mounted to a first gimbal about a first gimbal axis extending normally to a direction of the bidirectional light beam, the first gimbal being mounted to the first base about a first base axis extending normally to the first gimbal axis, and the second head unit is mounted to a second gimbal about a second gimbal axis extending normally to the direction of the bidirectional light beam, the second gimbal being mounted to the second base about a second base axis extending normally to the second gimbal axis.

16. A method of tracking a position and orientation of an object in an environment using a tracking system including:
   a) a tracking base positioned in the environment;
   b) a tracking target mountable to the object, wherein in use the tracking base is linked to the tracking target by:
      i) a bidirectional light beam transmitted between the tracking base and the tracking target; and,
      ii) a unidirectional light beam transmitted between the tracking base and the tracking target, the unidirectional light beam parallel to the bidirectional light beam; and,
   wherein the method includes in at least one controller:
      (1) receiving signals from a sensor housed in at least one of the tracking base and the tracking target that detects the unidirectional light beam; and,
      (2) determining a roll angle of the tracking target relative to the tracking base at least in part using the received signals;
   wherein the tracking system includes an optical mount by which the unidirectional light beam is received, the optical mount mounted on at least one of the tracking base and tracking target, the optical mount housing the sensor and configured for controlled rotation about an axis of rotation that is coaxial with the bidirectional light beam, and wherein the method further includes in the at least one controller:
      i) processing the signals received from the sensor to determine the location of the unidirectional light beam incident on the sensor surface; and
      ii) causing the optical mount to rotate about the axis of rotation that is coaxial with the bidirectional light beam in accordance with the processed signal so as to locate the unidirectional light beam on a centre of the sensor surface and maintain linkage of the unidirectional light beam transmitted between the tracking base and the tracking target.

17. The method according to claim 16, wherein the method includes in the at least one controller:
   a) determining a displacement of the unidirectional light beam relative to a datum position on a surface of the sensor using the received signals; and,
   b) determining a roll angle using the determined displacement.

* * * * *